United States Patent [19]

Verissimo et al.

[11] Patent Number: 5,841,654
[45] Date of Patent: Nov. 24, 1998

[54] WINDOWS BASED NETWORK CONFIGURATION AND CONTROL METHOD FOR A DIGITAL CONTROL SYSTEM

[75] Inventors: Ernani Sperandio Verissimo, Ribeirão Preto; Gerson Valentin; Marco A. O. Pagnano, both of Sertãozinho; Omar Sacilotto Donaires, Ribeirão Preto; Vanderlei L. D. Miranda, Sertãozinho, all of Brazil

[73] Assignee: SMAR Research Corporation, Ronkonkoma, N.Y.

[21] Appl. No.: 543,434

[22] Filed: Oct. 16, 1995

[51] Int. Cl.$^6$ ................................................ G05B 9/02
[52] U.S. Cl. .................. 364/188; 370/85.1; 370/20.1; 370/254; 370/255; 370/257; 370/258; 395/500; 395/159; 371/20.1
[58] Field of Search ............................... 364/188, 551.01; 395/500, 159; 370/85.1, 254, 257, 258, 255; 371/20.1

[56] References Cited

U.S. PATENT DOCUMENTS

| | | | |
|---|---|---|---|
| 4,304,001 | 12/1981 | Cope ............................................. | 371/8 |
| 4,663,704 | 5/1987 | Jones et al. ............................... | 364/188 |
| 4,862,345 | 8/1989 | Lekron ....................................... | 364/188 |
| 5,134,574 | 7/1992 | Beaverstock et al. .............. | 364/551.01 |
| 5,168,441 | 12/1992 | Onarheim et al. ........................ | 364/146 |
| 5,261,044 | 11/1993 | Dev. et al. ................................ | 395/159 |
| 5,280,477 | 1/1994 | Trapp ...................................... | 370/85.1 |
| 5,301,301 | 4/1994 | Kodosky et al. ......................... | 395/500 |
| 5,335,339 | 8/1994 | Maejima et al. ......................... | 395/500 |
| 5,371,895 | 12/1994 | Bristol ..................................... | 395/800 |
| 5,386,360 | 1/1995 | Wilson et al. ............................ | 364/146 |
| 5,442,693 | 8/1995 | Crowder et al. ........................ | 371/20.1 |
| 5,485,620 | 1/1996 | Sadre et al. .............................. | 395/700 |

OTHER PUBLICATIONS

Fieldbus Foundation™, Fieldbus Specification, Function Block Application Process—Part 1, FF-94-890, Revision PS 1.0,Apr. 27, 1995.
Fieldbus Foundation™, Fieldbus Specification, Function Block Application Process—Part 2, FF-94-891, Revision PS 1.0,Apr. 27, 1995.
"SMAR,Fieldbus Tutorial", SMAR Int'L. Corp. 1993.

*Primary Examiner*—Reba I. Elmore
*Assistant Examiner*—McDieunel Marc
*Attorney, Agent, or Firm*—Kenyon & Kenyon

[57] ABSTRACT

A system for configuring a process control system, e.g., a Fieldbus network, having intelligent field mounted devices coupled to a data communications bus. A software representation of the process control system to be configured is first designed on a computer. Using the system, a user selects representations of the various field mounted devices to be included in the actual control system. The user then specifies which function blocks of each field mounted device are to be used and how those function blocks are to be linked. The computer is then coupled to the communications bus of the actual control system via an interface device and the configuration and link data are downloaded to the field mounted devices of the control system. The computer can act as a bus master of the communications bus of the control system with the field mounted devices acting as slaves. The computer can also be disconnected from the control system communications bus and the control system will operate with one of the field mounted devices acting as the bus master.

15 Claims, 30 Drawing Sheets

WINDOWS BASED NETWORK CONFIGURATION AND CONTROL METHOD FOR A DIGITAL CONTROL SYSTEM

FIELD OF THE INVENTION

The present invention relates to process control systems, and more particularly, to methods and apparatus for configuring and controlling digital control system networks and devices, e.g., Fieldbus networks.

BACKGROUND OF THE INVENTION

Process control relates to the control of processes, e.g., manufacturing processes, through the use of control devices including sensors, e.g., temperature sensors, pressure sensors, flow sensors, and digital computers. Presently, many sensors and other types of control devices include a central processing unit, memory for a program, e.g., function routines, parameters and control variables. Control devices which include CPUs are often referred to as smart devices.

Smart devices are often programmed to perform a variety of functions, e.g., convert pressure into a value representing volume or convert a command into a signal used to move a valve. Functions are frequently performed by software as well as hardware. A function, whether implemented in hardware or software, can be characterized as a function block. Each function block of a device may have a plurality of inputs and outputs, as well as internal parameters and internal signals which are used to perform the function.

A control system may include a plurality of smart devices coupled together via, e.g., a digital bus operating according to a preselected communication protocol. A Fieldbus is a bus which operates according to the Fieldbus communication protocol which is a bidirectional digital communications protocol. A Fieldbus network is a plurality of smart devices coupled together via a Fieldbus.

The Fieldbus communications protocol is described in "SMAR, FIELDBUS TUTORIAL", which is published by SMAR INT'L CORP., 1993 which is hereby expressly incorporated by reference. As discussed in the cited reference, the Fieldbus communications protocol permits devices coupled to a Fieldbus to communicate system configuration information, sensed values, function parameters, etc. between each other and a master computer over a Fieldbus.

Access to the Fieldbus may be controlled using a token system, wherein a token is used to indicate which device is authorized to initiate a transaction on the Fieldbus. In such an embodiment, a master device or computer, sometimes referred to as a link active scheduler, serves to insure that the token is passed to each device requesting to initiate a bus transaction according to a preselected scheduling order.

In addition to the "SMAR, FIELDBUS TUTORIAL" additional references which describe the Fieldbus communications protocol include FIELDBUS FOUNDATION™, Fieldbus Specification, Function Block Application Process, Parts 1 and 2, Revision PS 1.0, Apr. 27, 1995 which are hereby expressly incorporated by reference. The cited Fieldbus Specification documents, are useful in providing insights into the communication protocols used for communicating information between various function blocks implemented in devices coupled to Fieldbus networks and for providing a better understanding of function blocks in general.

While Fieldbus systems offer several advantages over prior art control networks, because a plurality of different smart devices may be coupled to a single Fieldbus, and each device must often be configured with, e.g., control and parameter information so that it will properly respond to other devices on the bus and perform the various functions desired, it has become a relatively complicated process to program field mounted devices coupled to a Fieldbus.

The difficulty in configuring Fieldbus devices and a Fieldbus network is often complicated by the limited screen size provided on field mounted devices and the limited number of inputs provided on such devices. With a relatively limited number of inputs on a device, e.g., one or two buttons, it is often necessary to scroll through a plurality of menus, in a preselected sequence, until the device is properly set. Errors in setting parameter values may require an operator to scroll through several screen displays before the parameter values can be reset.

In addition, it may be difficult or impossible to configure the entire network using the inputs and display incorporated into a single field mounted device requiring an operator to individually configure a plurality of field mounted devices by physically visiting and setting each device.

Accordingly, there is a need for an improved method and apparatus for configuring a Fieldbus network so that an operator can configure the entire network with a minimal amount of difficulty. Furthermore, it is desirable that the operator be able to visually see a graphical representation of the Fieldbus network including the devices coupled thereto when configuring the network. It is also desirable that the operator be able to easily set and reset parameter and control information for each of the system devices from a single location.

It is also desirable that the configuration method and apparatus be capable of being used from any point on the Fieldbus, e.g., either in a control room or in the field near a device on the Fieldbus.

SUMMARY OF THE INVENTION

The present invention is directed to methods and apparatus for configuring digital control system networks and devices, e.g., Fieldbus networks.

In accordance with the present invention, a computer, e.g., a notebook personal computer, running a WINDOWS™ based configuration and network control program, implemented in accordance with the present invention, is used as a network configuration device.

In accordance with the present invention, a graphical representation of the various elements of a Fieldbus network are illustrated as icons linked together by a line representing a Fieldbus.

In one embodiment, the graphical representation of the Fieldbus network is created by first displaying an icon representing a computer. After the computer icon is displayed a user is permitted to select an interface device, for coupling the computer to the fieldbus network to be configured or controlled, from a menu of available interface devices. Upon selection of an interface device, an interface icon representing the interface is added to the graphic representation of the Fieldbus network with the interface icon being linked to the computer icon.

Once an interface has been selected, a user can select from a list of possible field mounted devices, field mounted devices which are part of the Fieldbus network to be configured. Upon the selection of each field mounted device the program of the present invention generates an icon representing the selected device coupled to the fieldbus network. As part of the device selection process, a user is permitted to assign a TAG name to the field mounted device, and an address. Upon configuration, the address for a device is set to match the address of an actual field mounted device to which the selected device corresponds.

In the above described manner, the program of the present invention, in response to device selections and inputs from an operator, generates a graphical representation of the actual devices which comprise the Fieldbus network to be configured. At the same time the graphical representation of the Fieldbus network to be configured is generated a configuration file which includes a list of the devices in the network, the tag names, and the addresses assigned to the devices is generated.

After one or more devices have been selected to be included in the network to be configured and thus are incorporated into the graphical representation of the Fieldbus network, an operator may select device functions which are to be used. In one exemplary embodiment, this is done by using a mouse and clicking on the icon of a field mounted device. The computer program of the present invention detects the selection of the device icon and generates a list of available functions supported by the selected device icon. The operator may then select one or more of the available functions, represented as function blocks to be used. Selected functions are represented as icons connected to the icon of the device to which they correspond. The configuration file is updated to keep a record of the functions associated with each device which have been selected for use.

After generation of a network configuration file, e.g., in the above described manner, the program of the present invention permits an operator to establish input and output links between device function blocks. Such links indicate the passing of data or other information between the selected inputs and outputs.

The program of the present invention monitors the available computer input devices for input signals. Upon detecting a file command to open or create a new link file, which is used to store information on the links between various functions, the program of the present invention opens a links window. In one embodiment, the links window is displayed next to a configuration window in which the tree like representation of the Fieldbus network and the devices comprising the network is illustrated.

In accordance with the present invention, function blocks in the configuration window can be copied to the links window using, e.g., a mouse to select and drag function blocks to be copied. As function blocks are copied into the links window, the links file is updated to maintain a record of the functions that have been copied to the links window. The record may include, e.g., the tag name of the function, the tag name of the device to which the function belongs, the device addresses, and a record of the functions, parameter values, and the connection of the function inputs and outputs relative to other function blocks copied to the links window.

Once function blocks have been copied into the links window, where, in one embodiment, they are represented as circles with the function's tag name and device's tag name displayed on the circle, the function block inputs and outputs may be selected for linking.

The program of the present invention, detects the selection of a function block displayed in the links window and, upon detection of the selection of a function block generates a detailed block diagram of the function block illustrating the inputs and outputs of the function block. Each input and output may represent, e.g., a different variable or signal that may be transmitted to, or received from, another function block or device.

Once the detailed function block is displayed, a user selects an input or output to be linked to another function block. In the exemplary embodiment, this is done by using a mouse to click on the illustrated input or output which is then highlighted by the program. After making an input/output selection, the program removes the detailed diagram of the function block from the screen and returns to the link window to provide the operator the opportunity to select another function block input or output to couple the previously selected input/output.

After an input and an output are selected for linking in the above described manner, the program generates a line connecting the functions which have been linked to represent the link existing therebetween. The link file is updated to indicate that the selected inputs and outputs are to be linked.

After creating a link file in the above described manner, indicating how information should be exchanged between function blocks of one or more devices, the configuration and link file may be downloaded to the field mounted devices.

The downloading process involves providing to each field mounted device, using the selected interface, all or some of the information stored in the link file. The link file information is transmitted over the Fieldbus using Fieldbus compliant signals.

In the above described manner, a computer, e.g., a portable notebook computer, using a program operating according to the present invention, can be used to configure and control an entire Fieldbus network. By permitting an operator to configure the network by generating a graphical representation of a Fieldbus network and the devices included therein, and then by permitting an operator to link inputs and outputs of function blocks of various field mounted devices in a graphical manner, Fieldbus network configuration is greatly simplified.

Other features and advantages of the method and apparatus of the present invention are described below.

DETAILED DESCRIPTION

Figure 1:
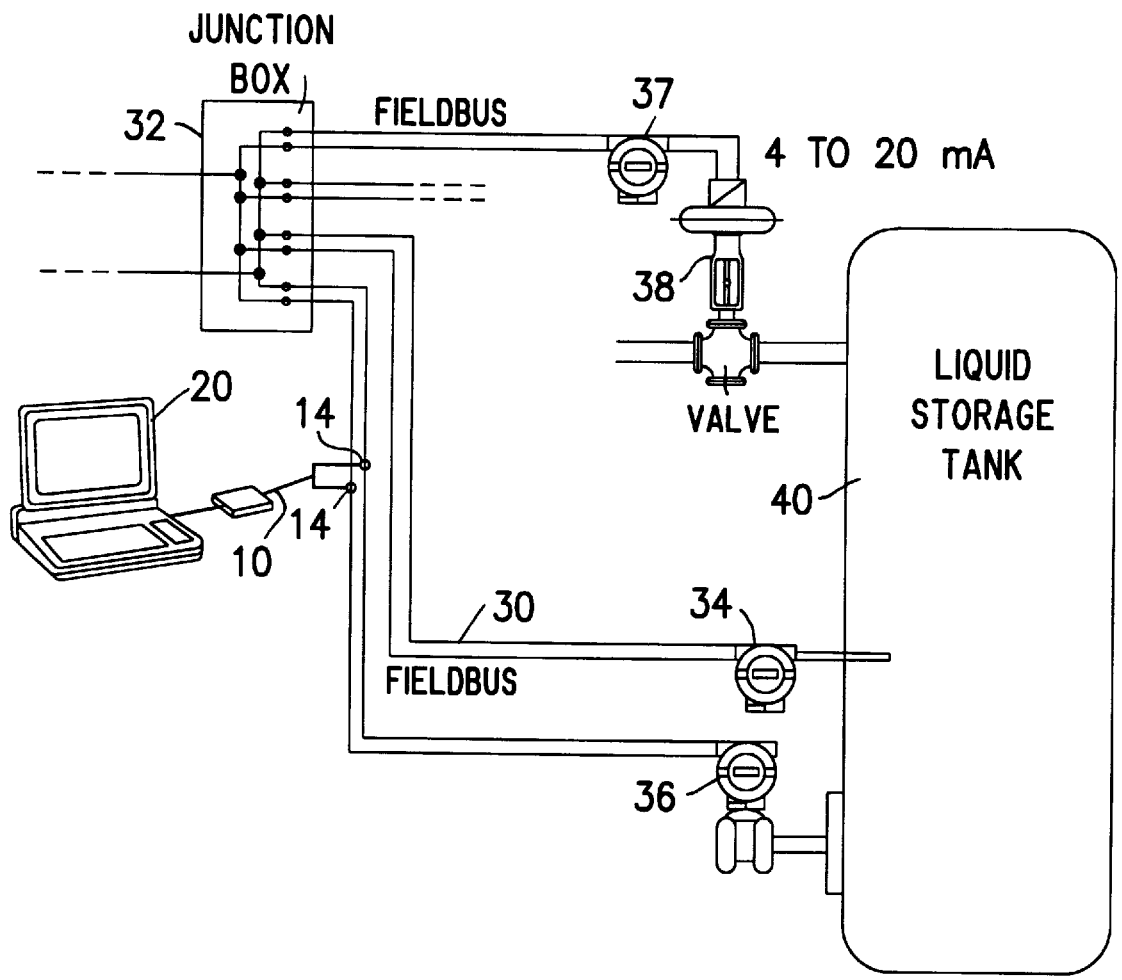
FIG. 1 is a schematic representation of a representative industrial process control system with a Fieldbus showing a computer coupled to the Fieldbus via an interface device.

FIG. 1 is a schematic representation showing a computer 20 coupled to a Fieldbus 30 of a representative process control system via an interface device 10. In the representative system of FIG. 1, which is used to control and monitor a liquid storage tank 40, the Fieldbus 30 is connected to several components such as a junction box 32, a temperature sensor 34, a pressure sensor 36 and an interface 37 for a valve 38.

The junction box 32 is used to couple together multiple branches of a Fieldbus system, as shown in FIG. 1.

The temperature sensor 34, which is coupled to the Fieldbus 30, monitors the temperature of the liquid storage tank 40 and generates signals indicative of the temperature for transmission over the Fieldbus. A commercially available temperature sensor which can be used as the temperature sensor 34 is the TT302 temperature sensor manufactured by Smar Equipamentos Ind. Ltda. of Brazil.

The pressure sensor 36, which is coupled to the Fieldbus 30, monitors the pressure of the storage tank 40 and generates signals indicative of the pressure for transmission over the Fieldbus. A commercially available pressure sensor which can be used for such a purpose is the LD302 pressure sensor manufactured by Smar Equipamentos Ind. Ltda. of Brazil.

The interface 37, which serves to convert bet-ween digital Fieldbus signals and analog 4–20 mA signals, is used to control a valve 38. The valve 38 controls the flow of fluid into or out of the storage tank 40 in response to signals placed by a controlling device on the Fieldbus 30. The valve control signals are received by the interface 37 which, in response, generates a corresponding analog 4–20 mA control signal which controls the actuation of the valve 38. The interface 37 can be implemented using an FI302 Fieldbus interface module manufactured by Smar Equipamentos Ind. Ltda. of Brazil.

The interface device 10 allows the computer 20 to transmit and receive signals on the Fieldbus 30. As a result, the computer 20 can monitor signals generated by sensors such as the temperature sensor 34 and the pressure sensor 36. The computer 20 can also generate control signals to control devices such as the valve 38, which is coupled to the Fieldbus 30 via the interface 37.

The interface device 10 is described more fully in U.S. patent application, Ser. No. 08/542,591, titled "COMPUTER TO FIELDBUS CONTROL SYSTEM INTERFACE", filed on Oct. 13, 1995, which is hereby expressly incorporated by reference. A commercially available device that can be used as the interface device is the BC1 interface device manufactured by Smar Equipamentos Ind. Ltda. of Brazil.

The computer 20 operates in accordance with the method of the present invention, as will be described below in greater detail.

In the system of FIG. 1, each field mounted device is an intelligent device capable of performing several different functions within the Fieldbus network to which the field mounted device is coupled. In addition to performing a parameter sensing or an actuation function, each field mounted device is capable of performing functions which control or affect other components of the Fieldbus network. The combination of such functions distributed among the field mounted devices coupled to a Fieldbus system form a complete control system which is capable of operating with or without the external control computer 20.

In accordance with the present invention, the computer 20 can be used to configure a Fieldbus network or system. In other words, the field mounted devices to be included in a Fieldbus control system, and the functional interrelationships among the various function blocks of the field mounted devices are specified by an operator using the computer 20. Information for programming the various field mounted devices in accordance with the operator's inputs are then downloaded from the computer 20 to the field mounted devices in order to implement the configuration and functional interrelationships specified during the configuration phase. In one embodiment, the computer 20 can then be disconnected from the Fieldbus 30 and the control system will then proceed to operate as programmed with one or more of the field mounted devices being responsible for controlling bus access and device scheduling.

Figure 2:
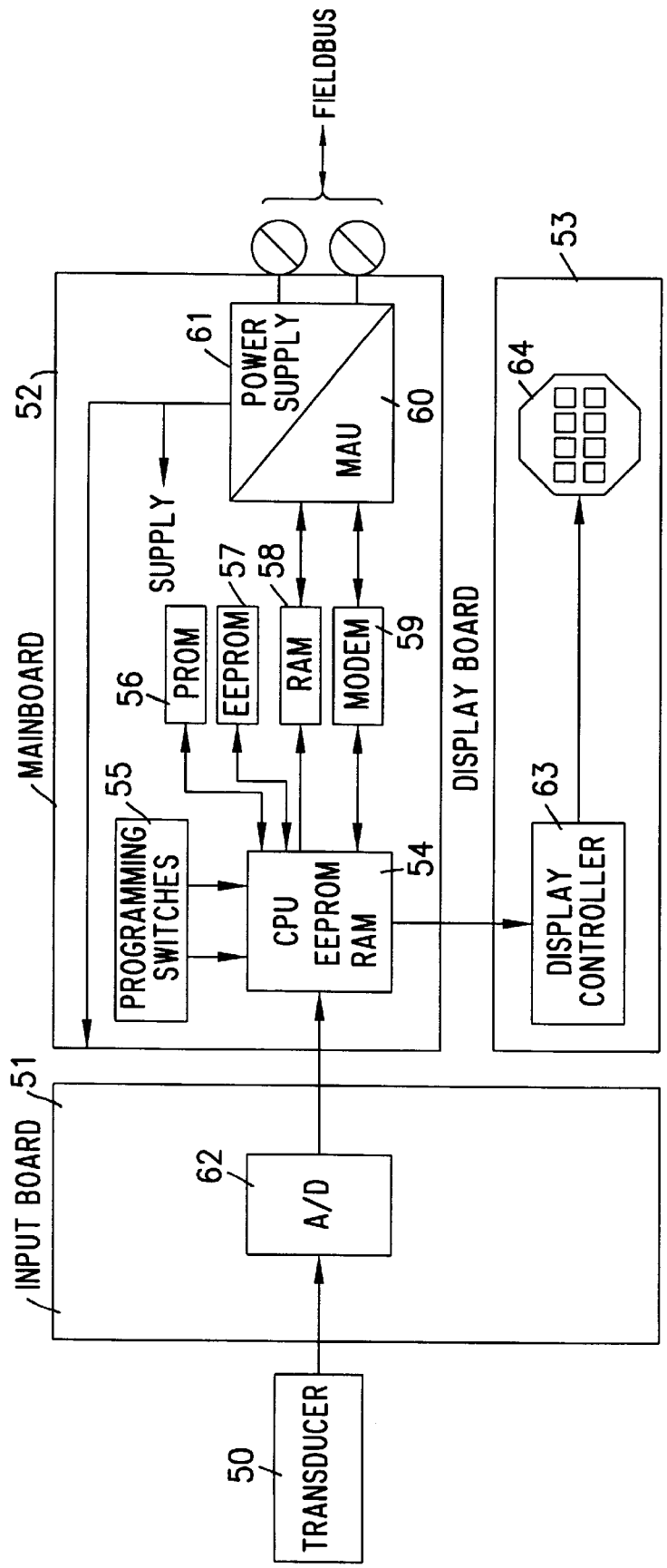
FIG. 2 is a block diagram of a typical field mounted device for coupling to a Fieldbus.

FIG. 2 is a block diagram of a representative Fieldbus-compatible field mounted device, such as a TT302 temperature sensor manufactured by Smar Equipamentos Ind. Ltda. of Brazil. The field mounted device comprises 4 major blocks: a transducer 50, an input board 51, a main board 52 and a display board 53. The transducer provides an analog signal which is indicative of a physical parameter sensed by the transducer 50, such as temperature. The sensor 50 is coupled to the input board which includes an analog-to-digital converter (A/D) 62 for converting the analog signal generated by the transducer into a digital format which is provided to the main board 52.

The main board 52 comprises a CPU 54, programming switches 55, a programmable read-only memory (PROM) 56, an electrically-erasable read-only memory (EEPROM) 57, a random-access memory 58, a modem 59, a medium access unit (MAU) 60 and a power supply 61.

The CPU 54 provides the intelligence of the field mounted device and is responsible for the management and operation of measurements, the execution of function blocks (described more fully below), self-diagnostics and communication. The CPU 54 operates in accordance with a program stored in the PROM 56. The RAM 58 provides temporary storage for variable data, whereas the EEPROM 57 provides non-volatile storage for data such as trim, calibration, configuration and identification information. The CPU 54 may also include a further EEPROM and RAM, on-chip.

The operation of the device of FIG. 2 can be modified via the programming switches 55 which are coupled to the CPU 54. The programming switches can be used to specify information such as trim, calibration, configuration and identification information and to initialize the devices's network address.

The CPU 54 is coupled to the modem 59 which modulates and demodulates signals communicated between the field mounted device and the Fieldbus to which the field mounted device is coupled. The MAU 60, which is coupled to the modem 59, conditions signals to and from the modem 59 for communication over the Fieldbus. The MAU 60 converts and combines the signals to and from the modem 59 onto the two wires of the Fieldbus and presents the proper electrical termination (in terms of impedance, signal level, pulse shape, etc.) on the Fieldbus for the field mounted device.

The power supply 61 is also coupled to the Fieldbus and from power supplied by the Fieldbus generates a stabilized DC voltage for powering the various components of the field mounted device.

The display board 53 comprises a display 64 and a display controller 63. The display controller 63 is coupled to the CPU 54 and in response to commands from the CPU 54 controls the display 64 to display information relating to the status and operation of the field mounted device.

Figure 3:
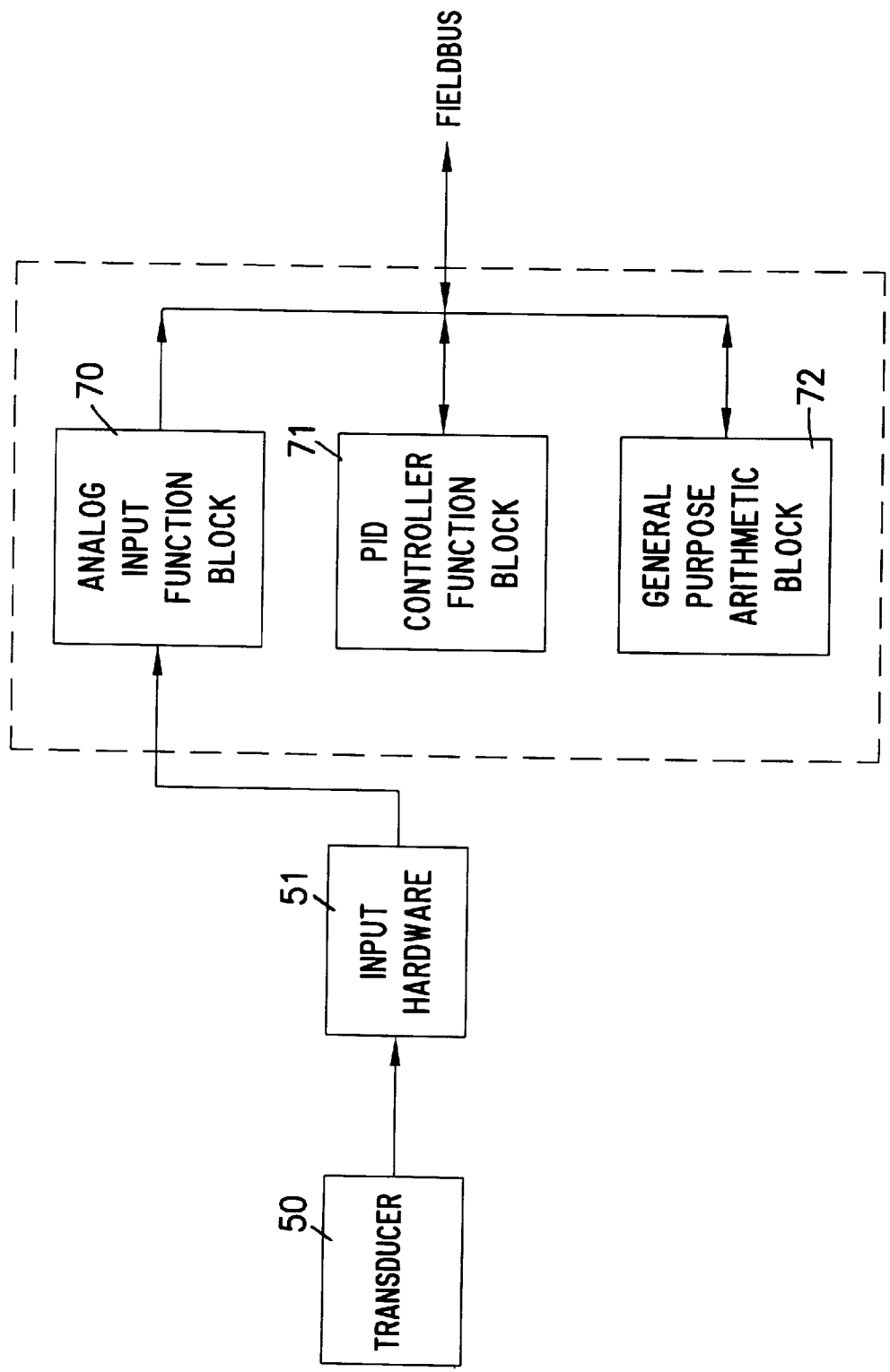
FIG. 3 is a block diagram illustrating function blocks included in the field mounted device of FIG. 2.

FIG. 3 is a functional-level representation of the field mounted device of FIG. 2 illustrating several exemplary function blocks representing some of the functions which the field mounted device of FIG. 2 can perform as part of a Fieldbus control system. As shown in FIG. 3, the exemplary field mounted device includes an analog input function block (AI) 70, a PID controller block 71 and a general purpose arithmetic block 72.

The analog input block 70 makes the temperature (or other) measurement performed by the field mounted device available to the Fieldbus system for access by other field mounted devices. The analog input block 70 can also optionally apply damping to the measured signal and allows selection of the units of measurement.

The PID controller block 71 provides the functionality of a PID controller. This enables the field mounted device to operate as a controller of other devices on the Fieldbus.

The general purpose arithmetic block 72 provides a scaler value output as a function of one or more inputs in accordance with a selected algorithm. Typical arithmetic functions performed by the arithmetic block 72 include addition, multiplication and the calculation of square root. The arithmetic function block 72 is accessible by the field mounted device within which it resides as well as by other field mounted devices coupled to the Fieldbus.

In accordance with the present invention, once a user has specified the devices and their function blocks to be included in a Fieldbus system, the user can then build control strategies suitable for his application by linking the various function blocks of the field mounted devices. As mentioned above, the process of configuring a Fieldbus control system can be carried out with the use of a computer, e.g., portable notebook computer, programmed in accordance with the present invention.

The configuration process according to the present invention includes a design phase and a downloading phase. The design phase can be carried out by the computer 20 off-line, i.e., while the computer is disconnected from the Fieldbus. The computer 20 can then be coupled to the Fieldbus 30, as shown in FIG. 1, and the configuration information downloaded to the field mounted devices coupled to the Fieldbus. The computer 20 can be used to configure and/or control a Fieldbus network or control system. The structure and operation of such a computer will now be discussed in greater detail with reference to FIGS. 4 and 5A–5D.

Figure 4:
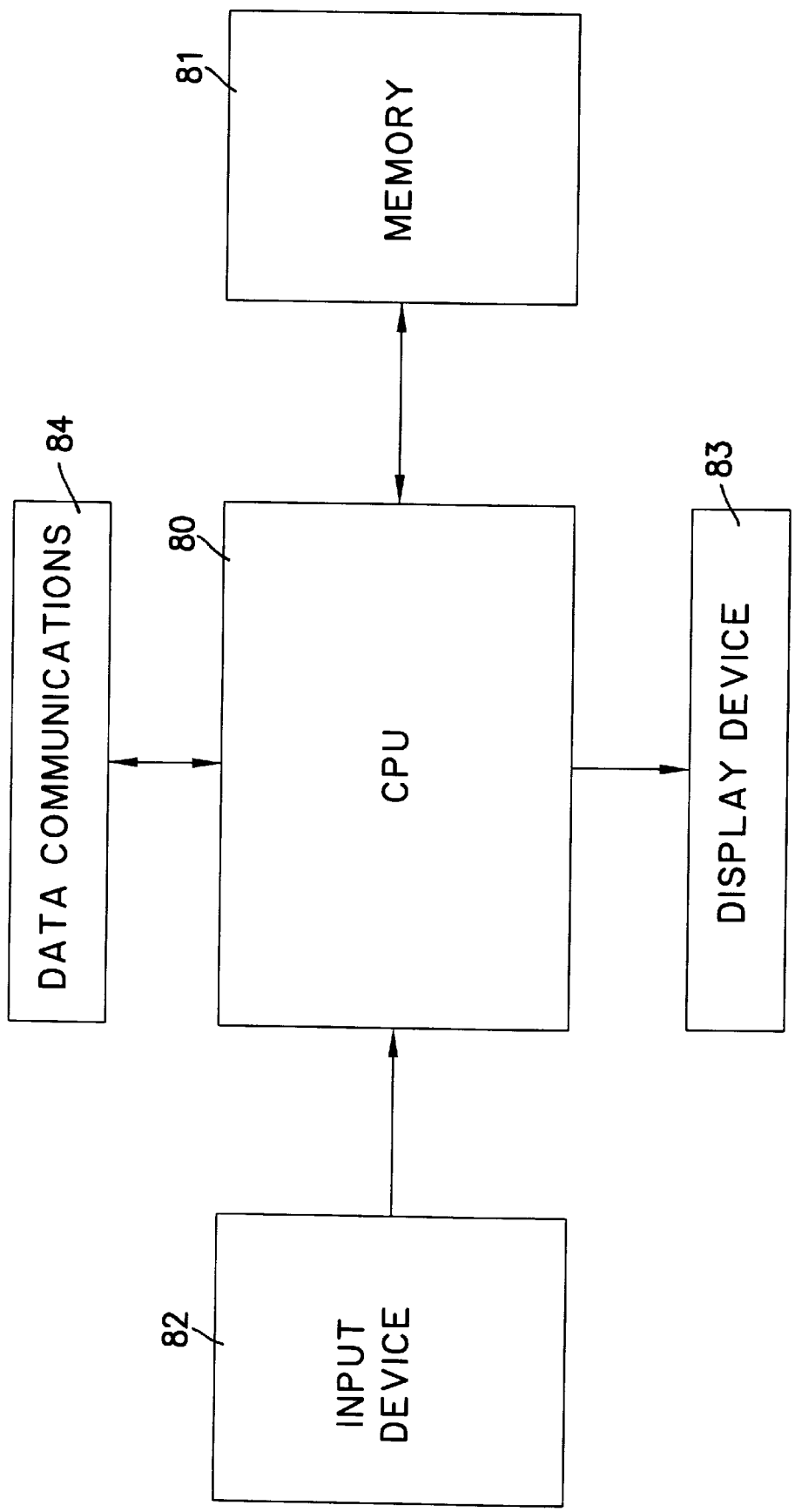
FIG. 4 is a block diagram of a computer used in the operation of the present invention.

FIG. 4 is a block diagram of the computer 20 for carrying out the configuration of and/or controlling a Fieldbus system in accordance with the present invention. A central processing unit ("CPU") 80 is coupled to a memory device 81, an input device 82, a display device 83 and a data communications device 84. The CPU 80, memory 81 and data communications device 84 can be, for example, parts of a desktop or laptop personal computer such as an IBM™-compatible personal computer, or a workstation, such as a Sun SPARC™ station. The input device 82 can be, for example, a keyboard and/or mouse, or any other device capable of receiving instructions from a user. The display device 83 can be any output device that is capable of displaying data to a user. For example, the display device 83 may be a computer video monitor. The memory 81 is used to store data operated upon by the computer and programming information for controlling the operation of the computer in accordance with the present invention. The memory 81 may be secondary memory, such as a disk drive, or primary memory, such as RAM, or a combination of both.

The data communications device 84 allows the computer to communicate with other devices and typically includes a serial communications port found on many personal computers.

The operation of the computer 20, in accordance with the present invention, will now be described with reference to FIGS. 5A through 5D, which show flow diagrams illustrating the operating steps of the computer 20. Reference will also be made to FIGS. 6A through 6S, which illustrate screen displays generated by the CPU 80 and displayed on the display device 83. In the exemplary embodiment described, the screens displayed are presented in a WINDOWS or a WINDOWS-like format. It should be clear, however, that a variety of formats are possible.

Figure 5A:
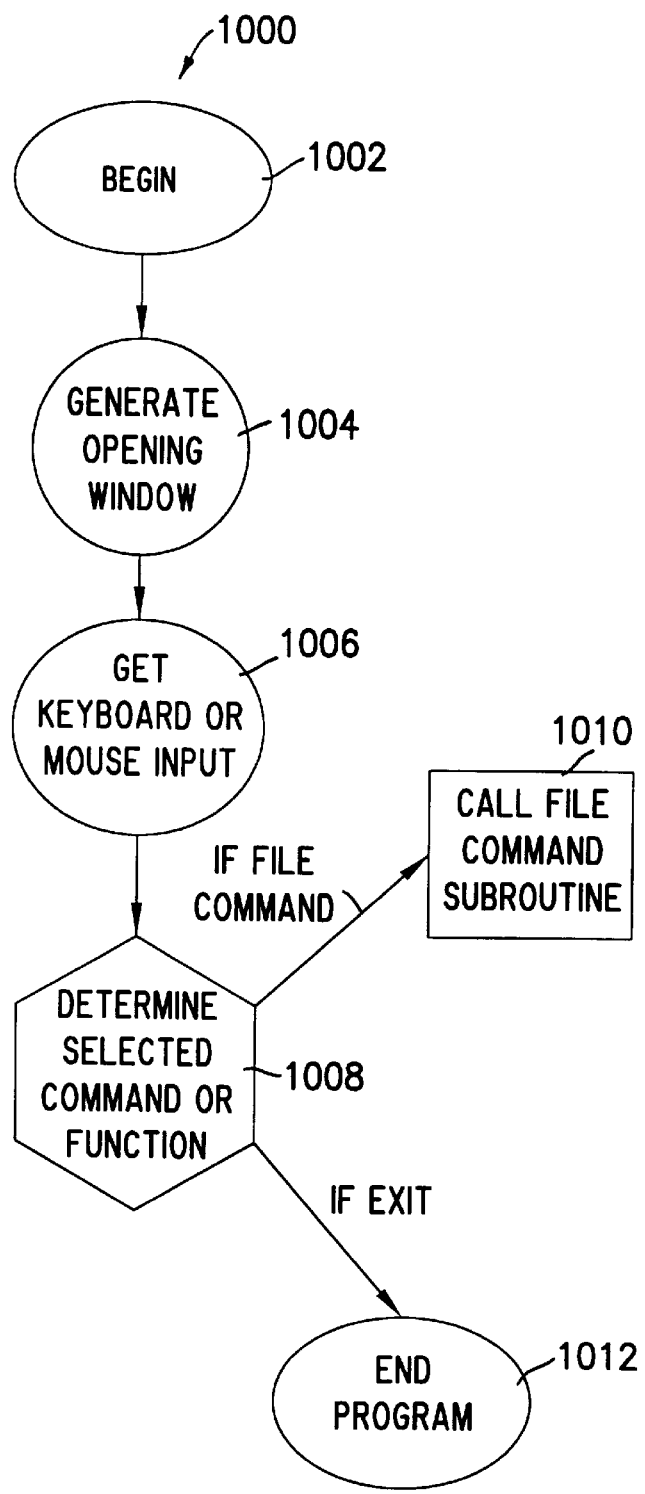
FIGS. 5A through 5D are flow diagrams illustrating the operation of the computer of FIG. 4, in accordance with the present invention.
Figure 6A:
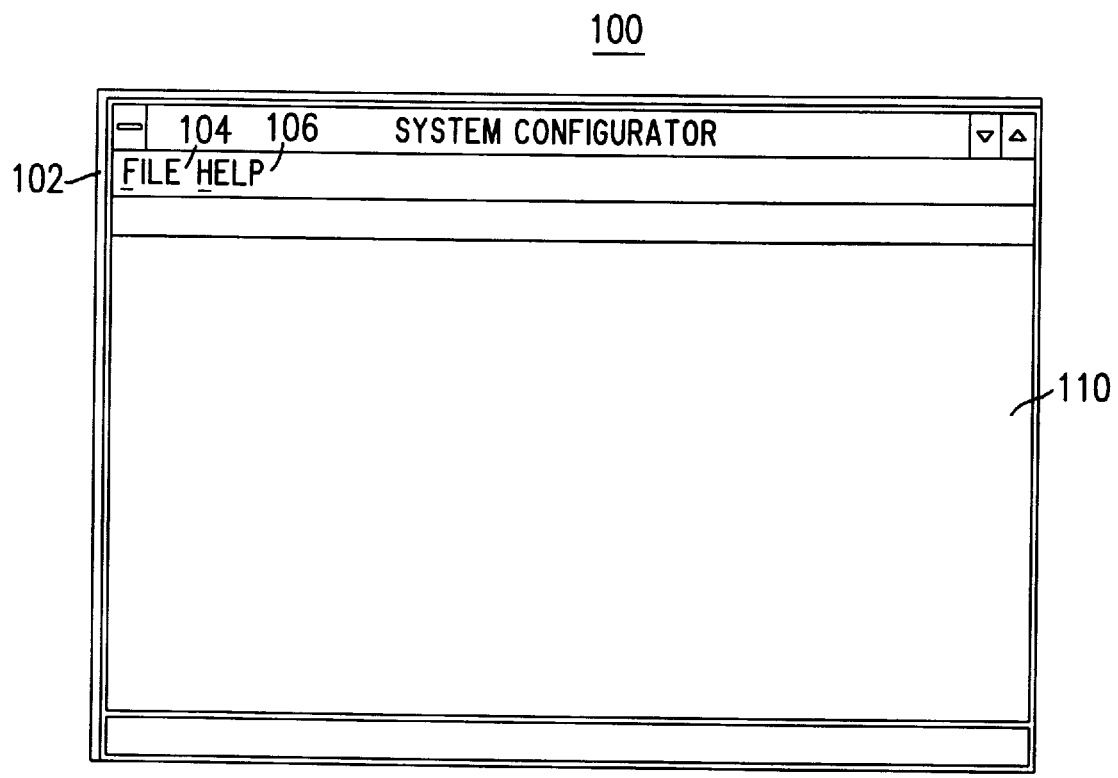
FIGS. 6A through 6S illustrate screen displays generated by an embodiment of the present invention.

Turning now to FIG. 5A, a flow diagram is illustrated of a main routine 1000 of a program for operating the computer 20 in accordance with the present invention. Operation of the main routine 1000 begins at step 1002 in which the program initializes at a known state.

Operation then proceeds to step 1004 in which an opening window 100, shown in FIG. 6A, is generated and displayed. In the representative embodiment, the opening window 100 is a rectangular window comprising a menu bar 102 and a display area 110.

The menu bar 102, located horizontally along the top portion of the window 100 comprises menu selection command File 104, for accessing a pull-down menu from which further file-related commands may be selected, and a Help menu selection command 106, for accessing on-line help information. Methods for generating the window 100 and menu bar 102 are well known in the art. As with conventional pull-down menu systems, a user seeking to access a pull-down menu associated with a command on the menu bar 102 or seeking to obtain on-line Help may do so by, e.g., typing the first letter of the appropriate menu selection command or by selecting the desired menu selection command through the use of an input device such as a mouse.

The on-line Help command 106 provides information on each of the commands available via the menu bar 102. Methods for providing on-line Help, in response to selection of the on-line Help Command will be apparent to those skilled in the art and need not be described further.

The display area 110 is located beneath the menu bar 102 and is used to display system configuration and function block linking information, as will be described more fully below. Because the window 100 illustrated in FIG. 6A is the opening window, it contains no configuration or function block linking information.

Upon selection of the File menu command 104, a File command pull-down menu (not shown) is displayed comprising a list of commands for creating new files, for retrieving (or "opening") existing files, and for closing and saving files. The exemplary program of the present invention deals with two types of files: configuration files, which specify a system configuration, and function link files, which specify the links among the various function blocks of a given system configuration. The contents of these files will be described more fully below. In addition, the File pull-down menu includes a Download command which is used to download configuration and function linking information to a control system, as will be described more fully below. The File command menu also includes other well-known commands such as Print, and Exit, for printing files and for exiting from the program.

Figure 5B:
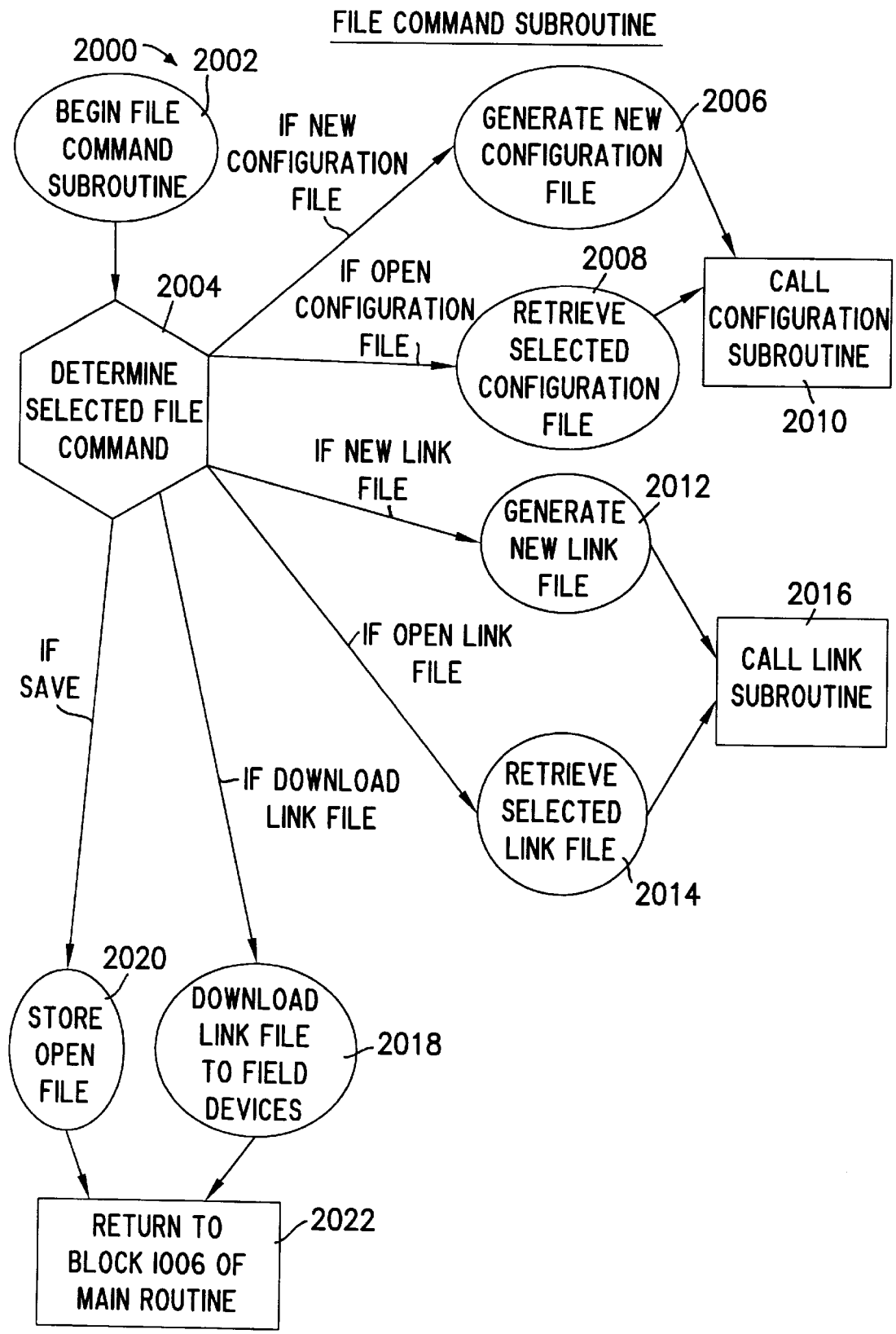

While displaying the opening window 100, the main routine awaits a keyboard or mouse input in step 1006. Upon such an input, operation proceeds to step 1008 in which the input is interpreted. If the Exit command was selected (via the File command menu), the program terminates at step 1012. If another File command was selected, operation proceeds to step 1010 in which a file command subroutine 2000, depicted in FIG. 5B, is called.

After beginning at step 2002, the file command subroutine proceeds to step 2004 in which it is determined which file command was inputted. If the user chooses to create a new configuration file, operation proceeds to step 2006 in which a new configuration file is opened. If the user chooses to open an existing configuration file, operation proceeds to step 2008 in which the selected configuration file is retrieved from memory. After a configuration file has been created in step 2006 or retrieved in step 2008, operation proceeds to step 2010 in which a configuration subroutine 3000 (described more fully below with reference to FIG. 5C) is called.

If it is determined in step 2004 that the user chooses to create a new link file or to open an existing link file, operation proceeds, respectively, either to step 2012, in which a new link file is generated, or step 2014, in which the selected existing link file is retrieved from memory. Whether a new link file is created, in step 2012, or an existing link file retrieved, in step 2014, operation then proceeds to step 2016 in which a link subroutine 4000 (described more fully below with reference to FIG. 5D) is called.

If it is determined in step 2004 that the user has selected the Download command, operation proceeds to step 2018 in which the user is prompted to select an existing link file which is then downloaded to the field mounted devices of the Fieldbus to which the computer is coupled. After this is done, operation returns to step 1006 of the main routine.

If it is determined in step 2004 that the user has selected the Save command, operation proceeds to step 2020 in which the currently open file(s) are stored in memory. Operation then loops back to step 1006 of the main routine.

Figures 1, 5C:
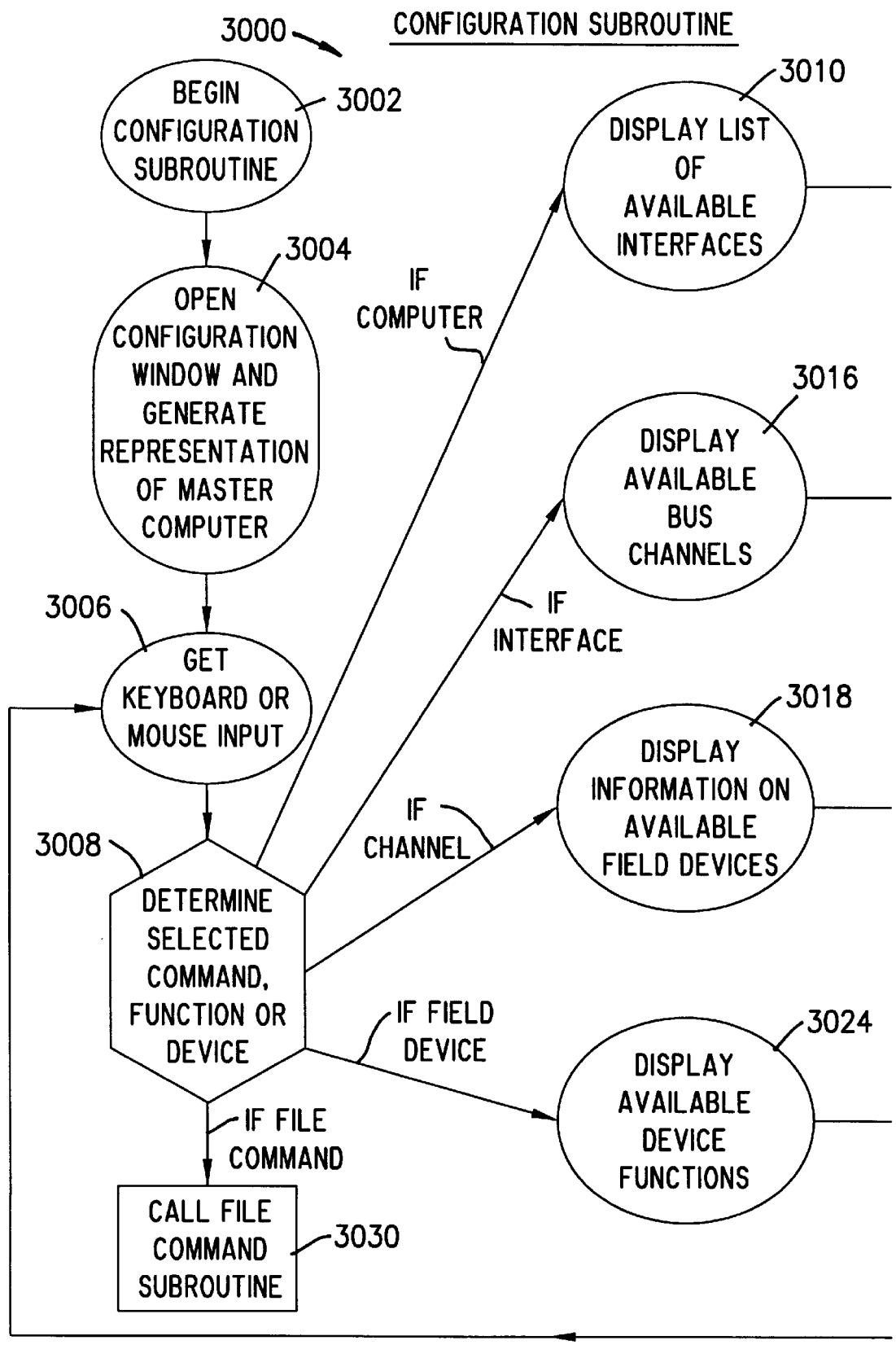
Figures 2, 5C:
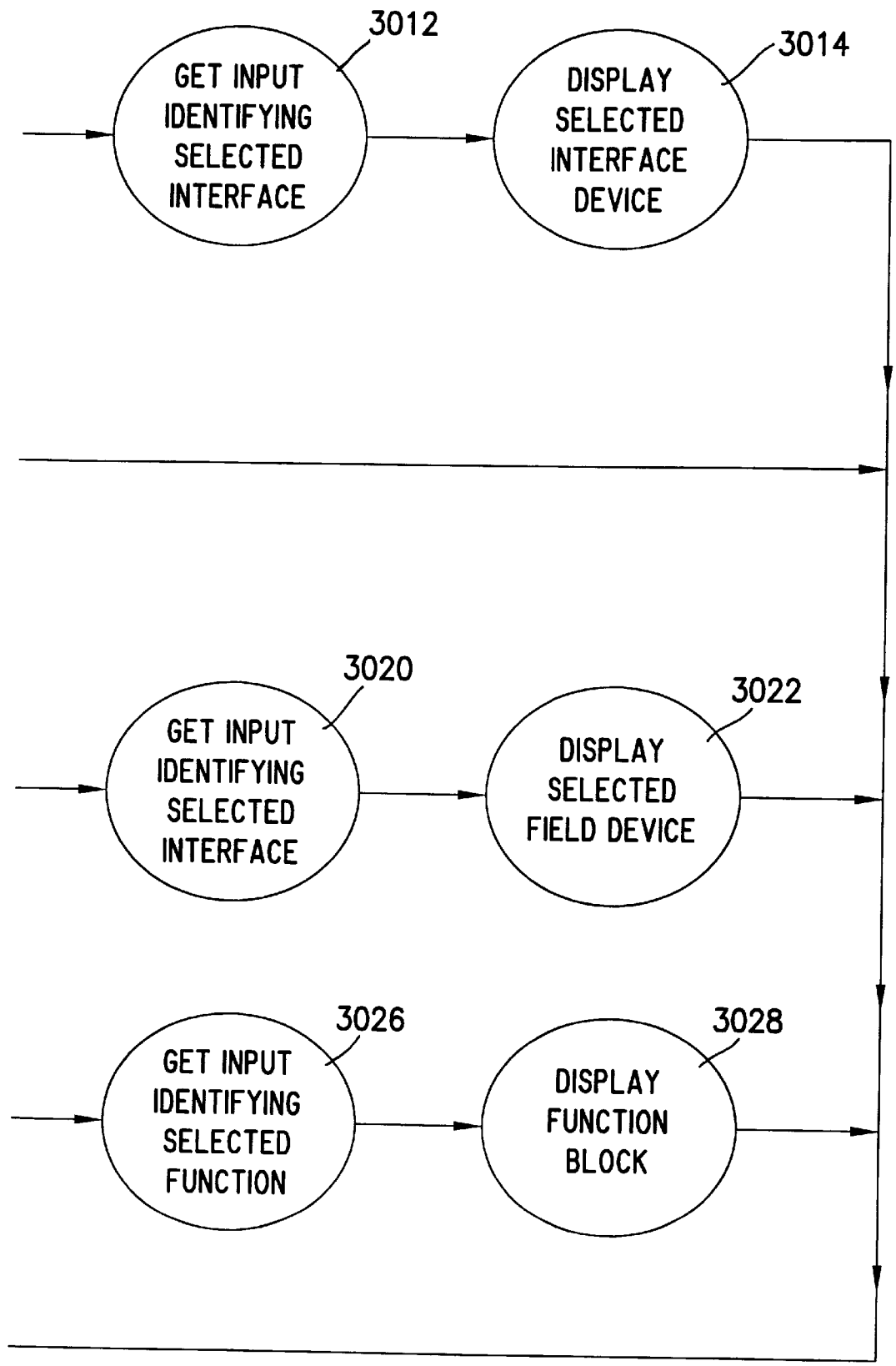
Figure 6B:
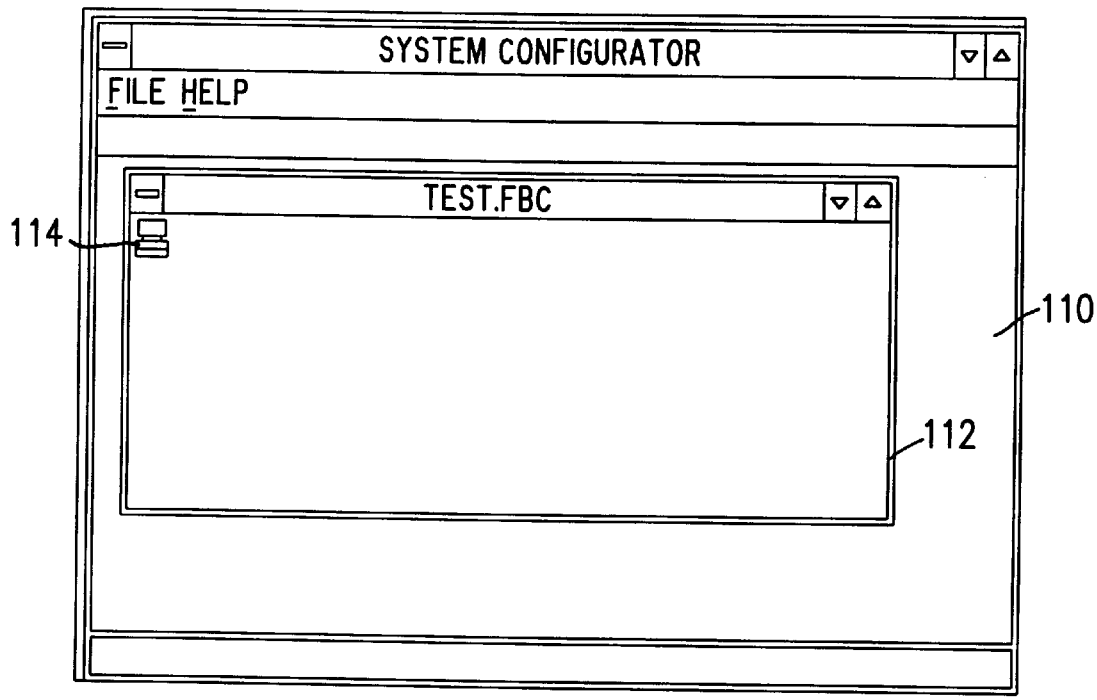

The configuration subroutine 3000 will now be described with reference to FIG. 5C. After the configuration subroutine is started in step 3002, operation proceeds to step 3004 in which a configuration window 112 is generated and displayed within the display area 110, as shown in FIG. 6B. At the same time, a graphical representation, or an icon, 114 of the master computer 20 is generated and displayed in the upper left corner of the configuration window 112.

Operation then proceeds to step 3006 in which a user input is awaited and interpreted at step 3008. At this point, the user can 1) select the File command, in which case operation proceeds to step 3030 in which the file command subroutine 2000 is called, 2) select the Help command in which case a help subroutine (not illustrated is called or 3) double click on the icon 114 with the mouse, in which case operation proceeds to step 3010. Other options such as selection of an interface, bus channel or field mounted device will be discussed below.

Figure 6C:
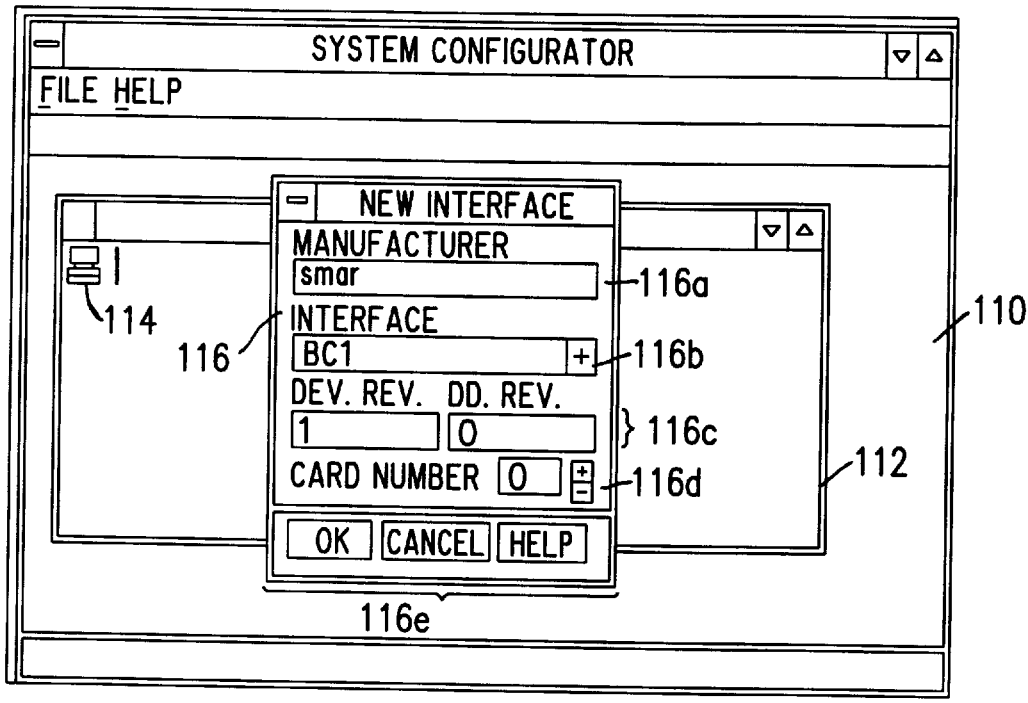

At step 3010, a window 116 is generated and displayed within the display area 110, as shown in FIG. 6C. The window 116 displays information relating to and allows the user to select one of several available interface devices by which the computer 20 is to interface to the Fieldbus system to be configured. Information on available interface devices is stored in memory or in a file as part of the method of the present invention. In the representative display shown in FIG. 6C, the window 116 displays information about the BC1 interface device manufactured by Smar Equipamentos Ind. Ltda. of Brazil. Other available devices include the four-channel PCI interface card manufactured by Smar Equipamentos Ind. Ltda. of Brazil. While the BC1 allows a computer to interface with one Fieldbus, the PCI interface card allows a single computer to interface with up to four Fieldbuses.

The manufacturer information is displayed in a field 116a of the window 11G, the selected interface device is displayed in a field 116b, version and revision numbers for the selected interface device are displayed in a field 116c and a card slot number, in the case of the PCI interface device, is displayed in a field 116d. A further field 116e includes representations of softkeys labeled "OK", "Cancel" and "Help". These are well-known commands which are used to confirm the user's selected changes, cancel the selected changes or request help information. Selection of the arrow icon in block 116b will result i the display of additional available interfaces, if any.

Figure 6D:
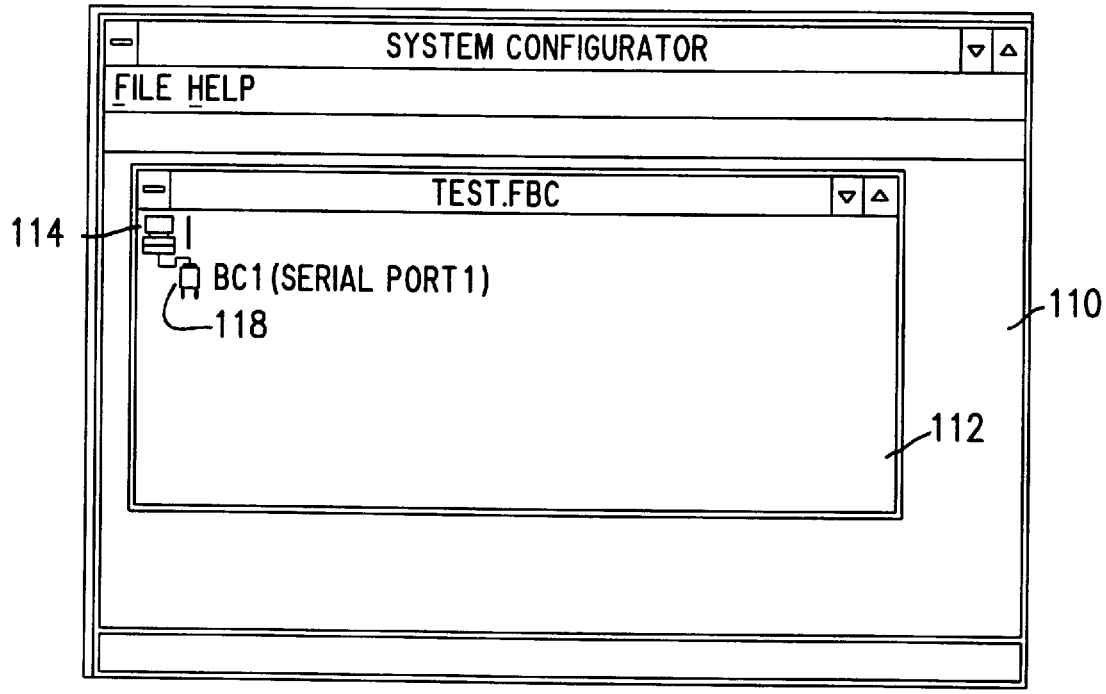

While displaying window 116, the user's input is awaited and acquired in step 3012. Once the user has selected an interface device, operation proceeds to step 3014 in which an icon 118 of the selected interface device is displayed in the configuration window 112, as depicted in FIG. 6D. The icon 118 shows the selected interface device, a EC1 in this example, connected to the icon 114 of the master computer. In addition, a label is displayed next to the icon 118 indicating the interface device type ("BD1") and the computer port to which the interface device is coupled ("Serial Port 1"), or in the case of the PCI, the computer card slot in which it is inserted.

Figure 6E:
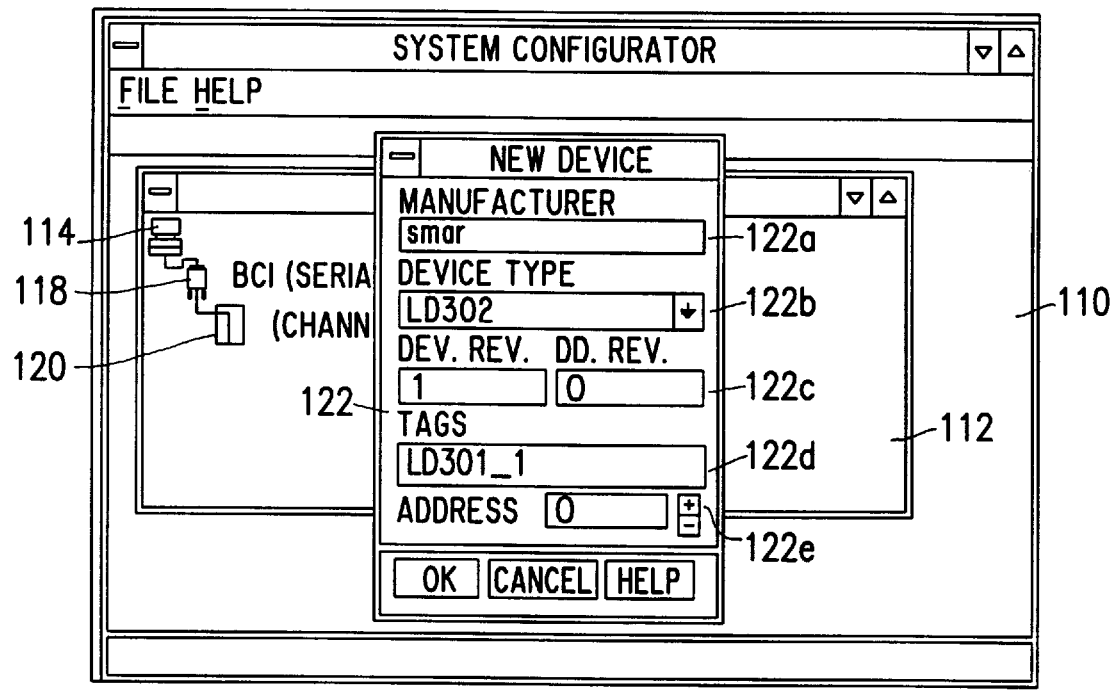

While the icons 114 and 118 of the master computer and interface device are displayed in the configuration window 112, operation of the configuration subroutine loops back to step 3006 in which a new user input is awaited. If, at step 3008, it is determined that the user has double-clicked on the icon 118 of the interface device, operation proceeds to step 3016 in which an icon 120 representative of the Fieldbus channels available with the selected interface device is displayed in the configuration window 112, as shown in FIG. 6E. In the example shown, in which a single-channel BC1 device is used, only one channel is shown connected to the icon 118 of the interface device.

While the icons 114, 118 and 120 of the master computer, interface device and Fieldbus channel are displayed in the configuration window 112, operation of the configuration subroutine loops back to step 3006 in which a new user input is awaited. If, at step 3008, it is determined that the user has double-clicked on the icon 120 of the Fieldbus channel, operation proceeds to step 3018 in which a window 122 is displayed in the display area 110, as shown in FIG. 6E. The window 122 displays information and allows the user to select one of several available field mounted devices to be included in the Fieldbus system to be configured. In the exemplary window shown in FIG. 6E, the window 122 displays information about an LD302 pressure sensor manufactured by Smar Equipamentos Ind. Ltda. of Brazil.

Information relating to the field mounted device selected via the window 122 is displayed in several different fields of the window and includes manufacturer, displayed in field 122a, device type, displayed in field 122b, and version and revision numbers, displayed in field 122c. In addition, a default tag and address are displayed in fields 122d and 122e for the selected field mounted device.

The tag is an alphanumeric string which is used to identify the selected field mounted device. The tag is used only as an aid to the user and does not have any internal significance. In one embodiment, the program of the present invention will automatically generate a default tag which will have some logical meaning (e.g., "LD302_1" connotes the first LD302 device selected for the current Fieldbus configuration) but which the user can overwrite by clicking on the field 122d and typing in a new, user-defined tag.

The address is a unique number assigned to each field mounted device that is selected for inclusion in the Fieldbus system being configured with the program of the present invention. The address selected for each field mounted device using the program of the present invention is used to generate a unique physical address by which the corresponding field mounted device is accessed on the Fieldbus. As discussed above, field mounted devices are set to preselected addresses upon installation, addresses selected by the user should match one of these preselected addresses.

In selecting an address for a field mounted device to be added to the Fieldbus system being configured, the lowest available address is displayed in the field 122e of the window 122. Although the user can overwrite the displayed address, he will not be allowed to select an address that has previously been assigned to another field mounted device.

Figure 6F:
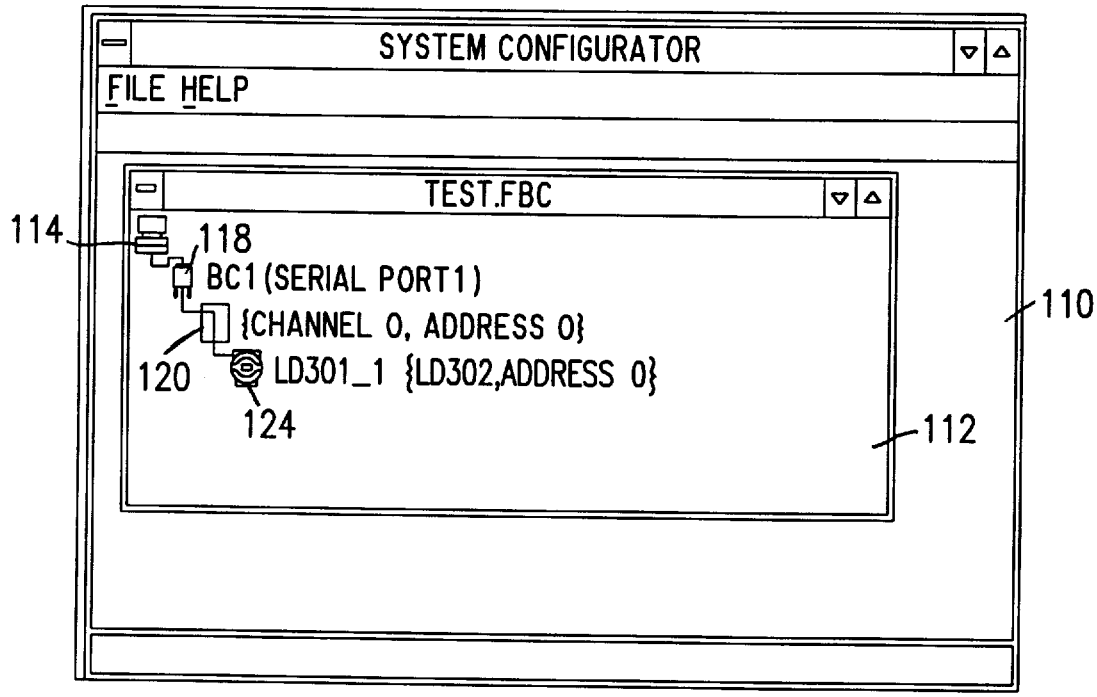

Once the program has acquired, at step 3020, the identifying information for a field mounted device selected for inclusion in the Fieldbus system being configured, operation proceeds to step 3022 in which an icon 124 representing the field component selected and identified via the window 122 is displayed in the configuration window 112, as shown FIG. 6F. Next to the icon 124, the tag of the selected field mounted device (e.g., "LD302_1"), the field mounted device type ("LD302") and the device address ("Address 0") are displayed.

Figure 6G:
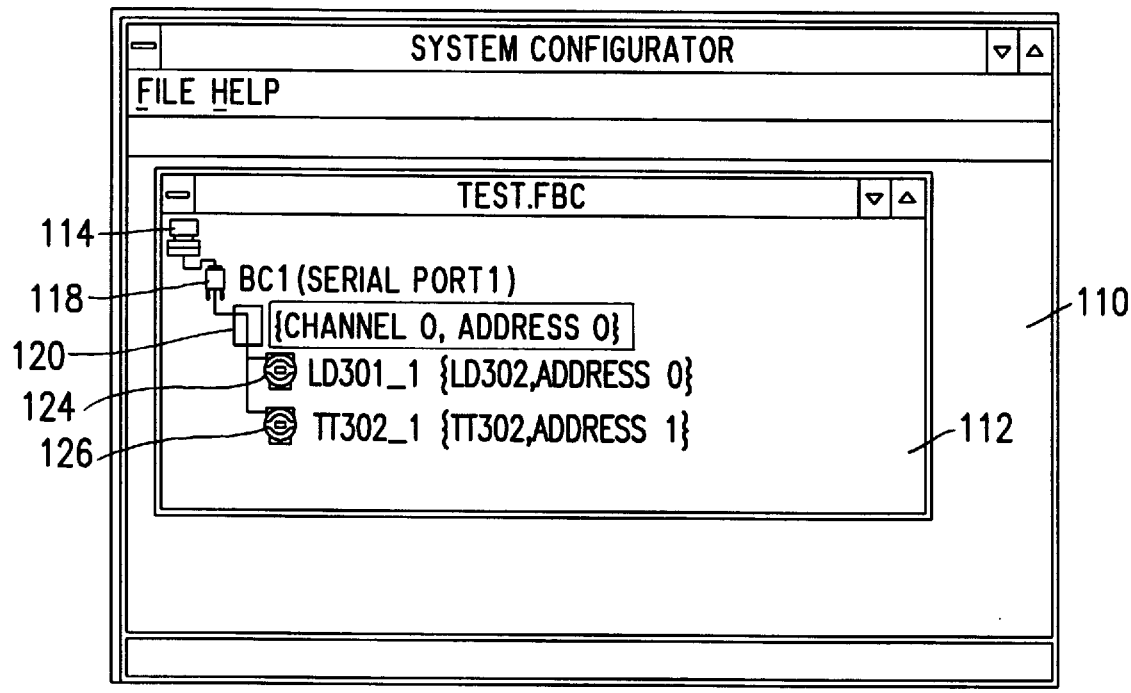

The above-described procedure for adding field components (steps 3008 and 3018–3022) is repeated for each field mounted device the user wishes to add to the Fieldbus system being configured with the program of the present invention. FIG. 6G illustrates the contents of the configuration window 112 for an exemplary Fieldbus system having a pressure sensor, represented by the icon 124, and a temperature sensor, represented by the icon 126. The icon 126 represents a TT302 temperature sensor manufactured by Smar Equipamentos Ind. Ltda. of Brazil.

Figure 6H:
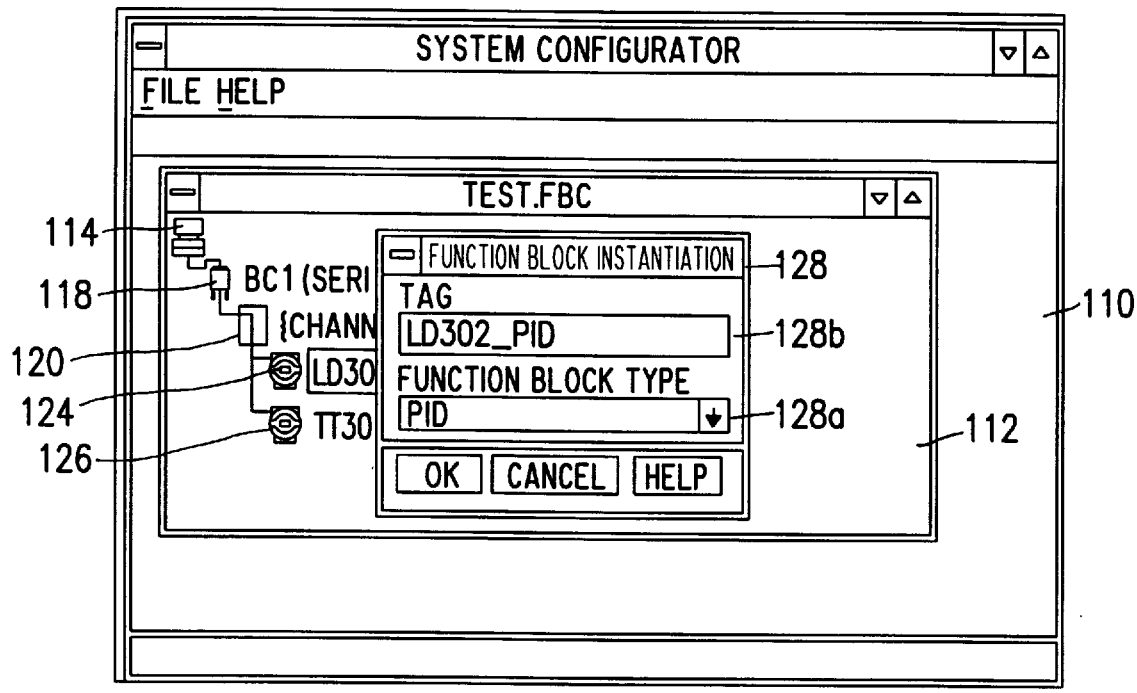

While the configuration window 112 displays the Fieldbus system being configured, operation of the configuration subroutine loops back to step 3006 in which a new user input is awaited. If, at step 3008, it is determined that the user has double-clicked on the icon of one of the field mounted devices, for instance icon 124, operation proceeds to step 3024 in which a window 128 is displayed in the display area 110, as shown in FIG. 6H. The window 128 allows the user to select one of several available function blocks for the field mounted device selected. The window 128 includes a field 128a which displays, one at a time, a list of function block types available for the selected field mounted device, such as a PID, in the example of FIG. 6H. The window 128 also includes a field 128b which, as in the case of the tag selection procedure described above, allows a user to select a tag for the selected function block. When the user is satisfied with his selection, he clicks on the OK button and the program acquires his input, as represented by step 3026.

Figure 6I:
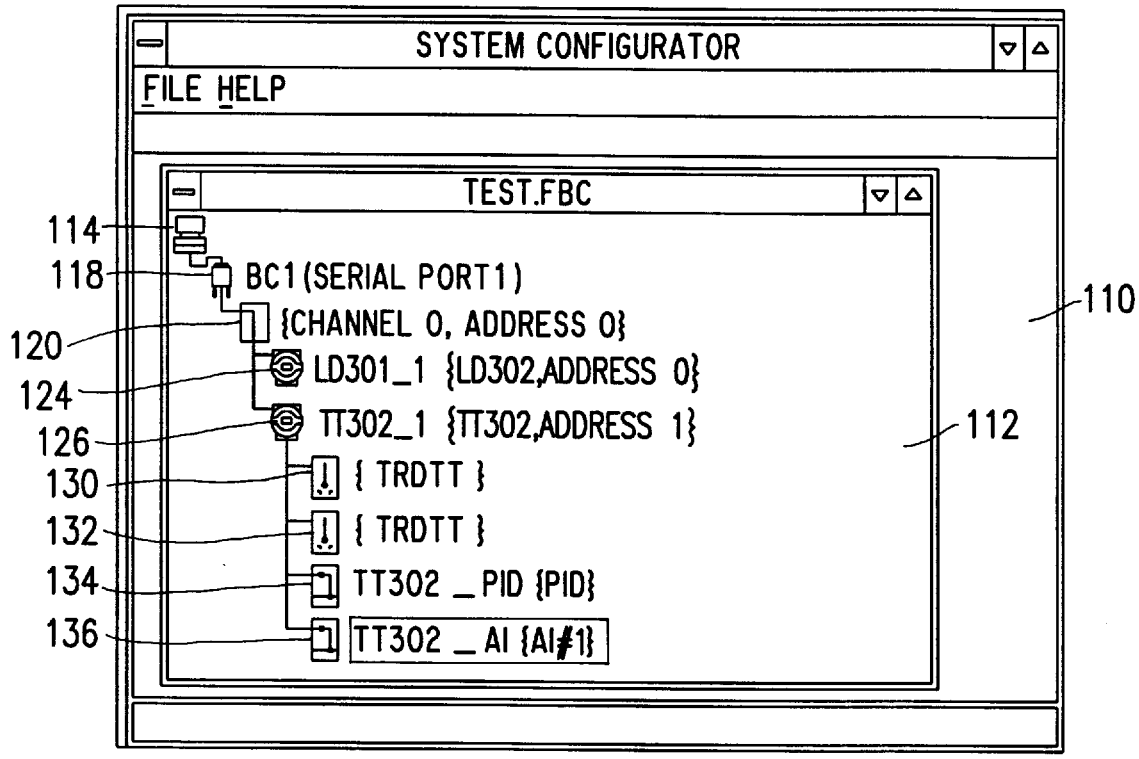

The program then proceeds to step 3028 in which an icon representing the selected function block is added to the display, in the configuration window 112, of the Fieldbus system in the process of being configured. FIG. 6I illustrates a representative display after the selection and addition of four function blocks represented by the icons 130–136.

Once the user has completed the process of selecting and identifying the field mounted devices and the function blocks to be included in the Fieldbus system to be configured, the user can then save the completed configuration file (represented by the configuration window 112) by selecting the Save command from the File command menu (i.e., step 2020 of the file command subroutine 2000 depicted in FIG. 5B.)

At this point of the configuration process, the links among the various function blocks of the Fieldbus system to be configured remain to be specified. To do this, the user, via the File command menu, can either create a new link file or retrieve an existing link file corresponding to the configuration file created by the procedure described above. The procedure for creating or retrieving a link file was described above in connection with FIG. 5B. Once this is done, the link subroutine 4000 is called at step 2016.

Figures 1, 5D:
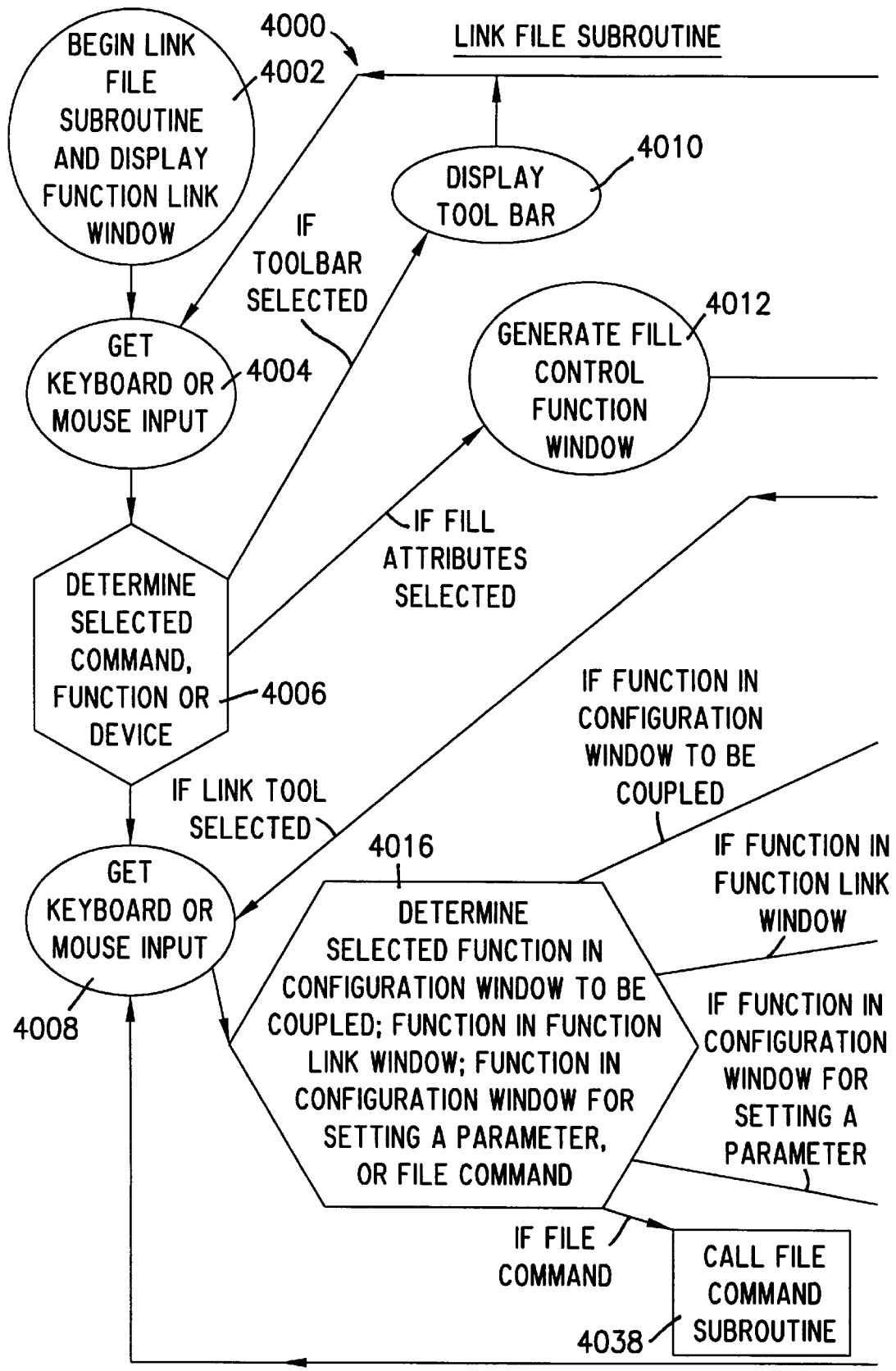
Figures 2, 5D:
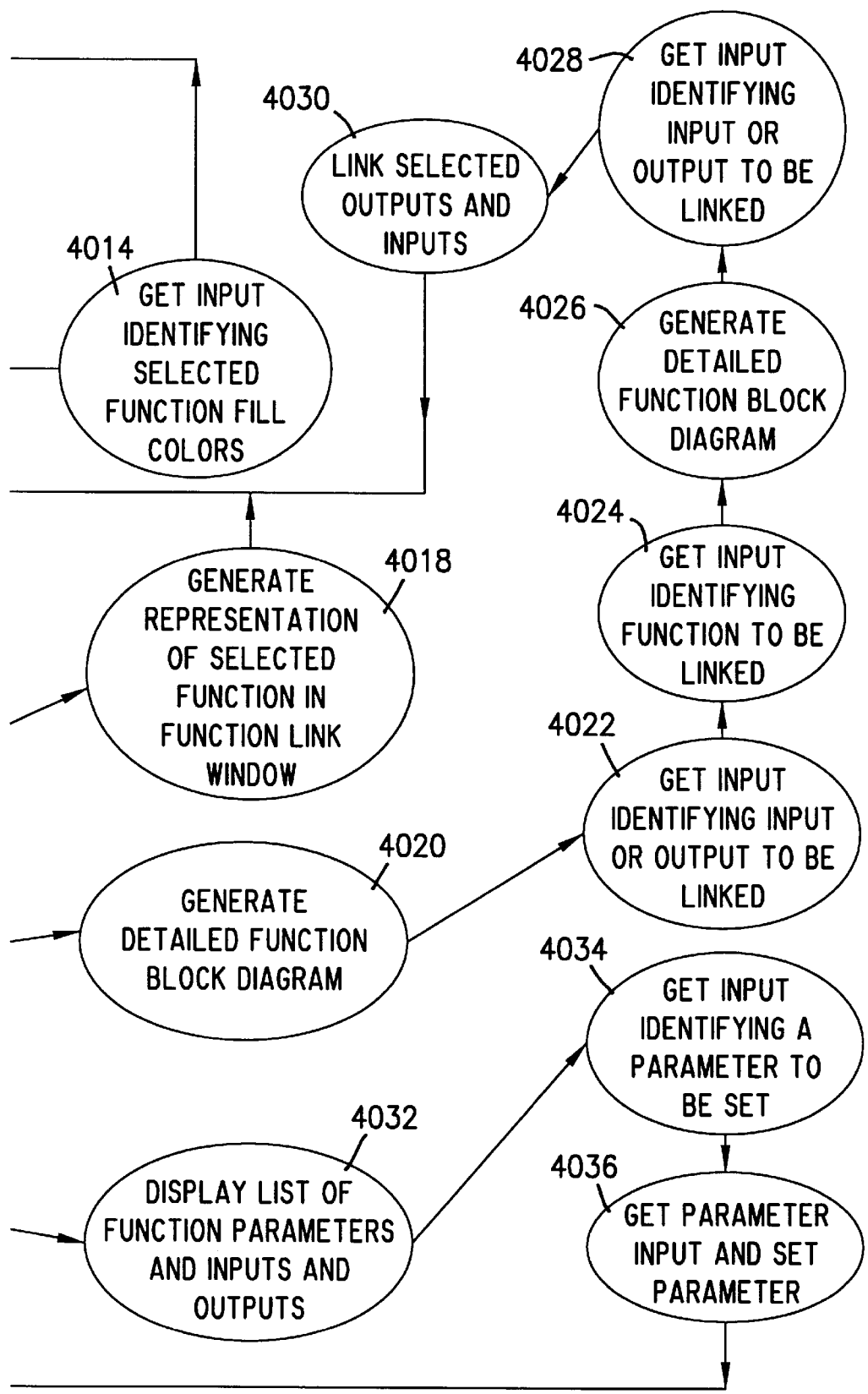
Figure 6J:
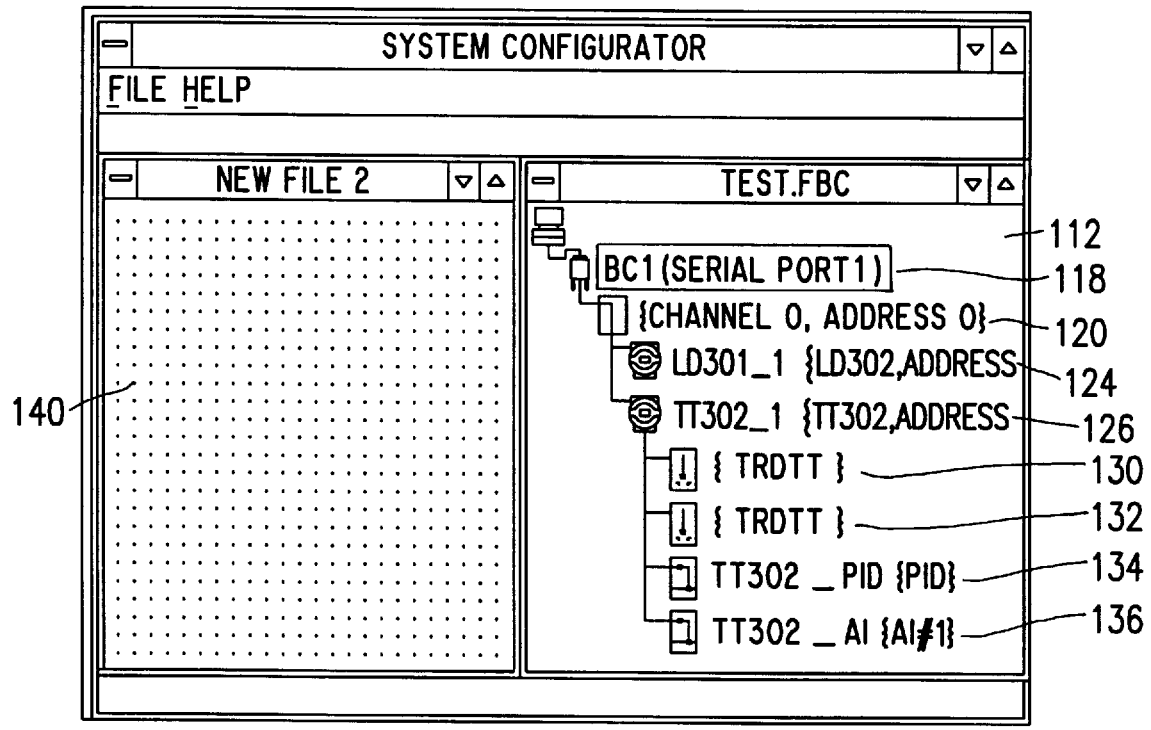

FIG. 5D is a flow diagram describing the link subroutine 4000. Once the user selects to create or retrieve a link file, the link file subroutine, at step 4002, begins by displaying a function link window 140 next to the configuration window 112 in the display area 110, as shown in FIG. 6J. At this point, when the user selects the File command, an additional Toolbar command is available on the File command menu.

Figure 6K:
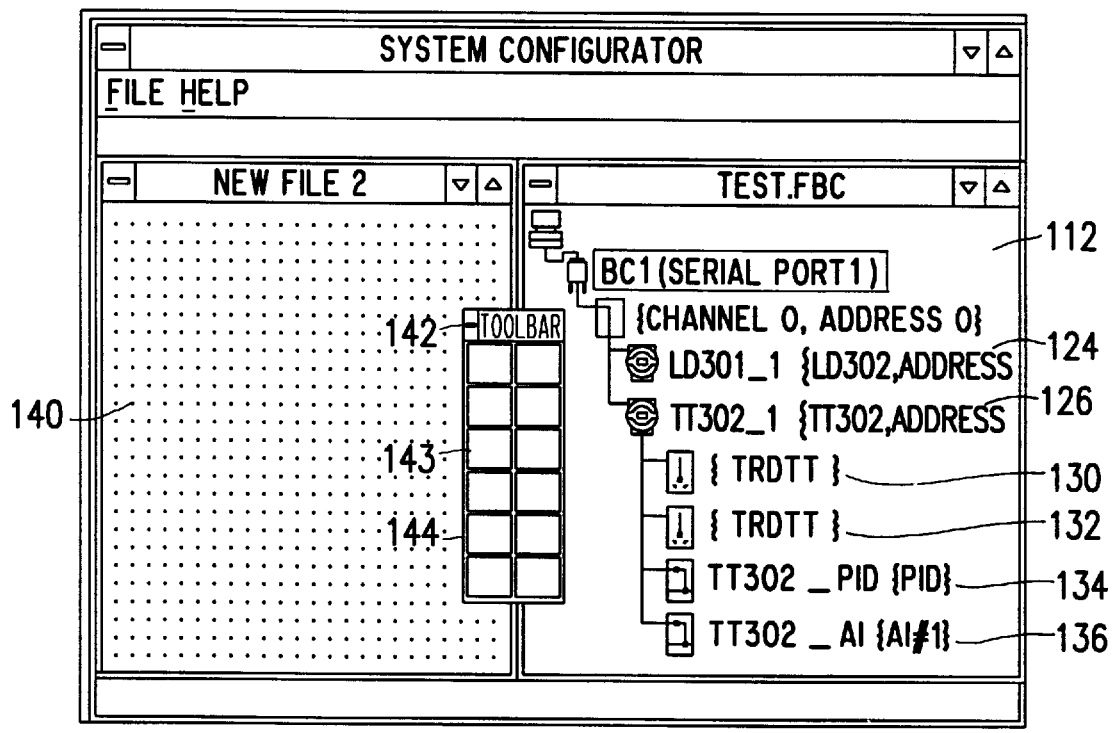

At step 4004, the user's input is awaited and acquired. If it is determined in step 4006 that the user has selected the Toolbar command from the File command menu, operation proceeds to step 4010 in which a toolbar 142 is displayed in the display area 110, as shown in FIG. 6K. The toolbar 142 includes several different fields which the user can select (e.g., by clicking on with the mouse) to invoke different functions that can be used in the function block linking procedure. While the toolbar is displayed, operation loops back to step 4004 to acquire the user's input.

Figure 6L:
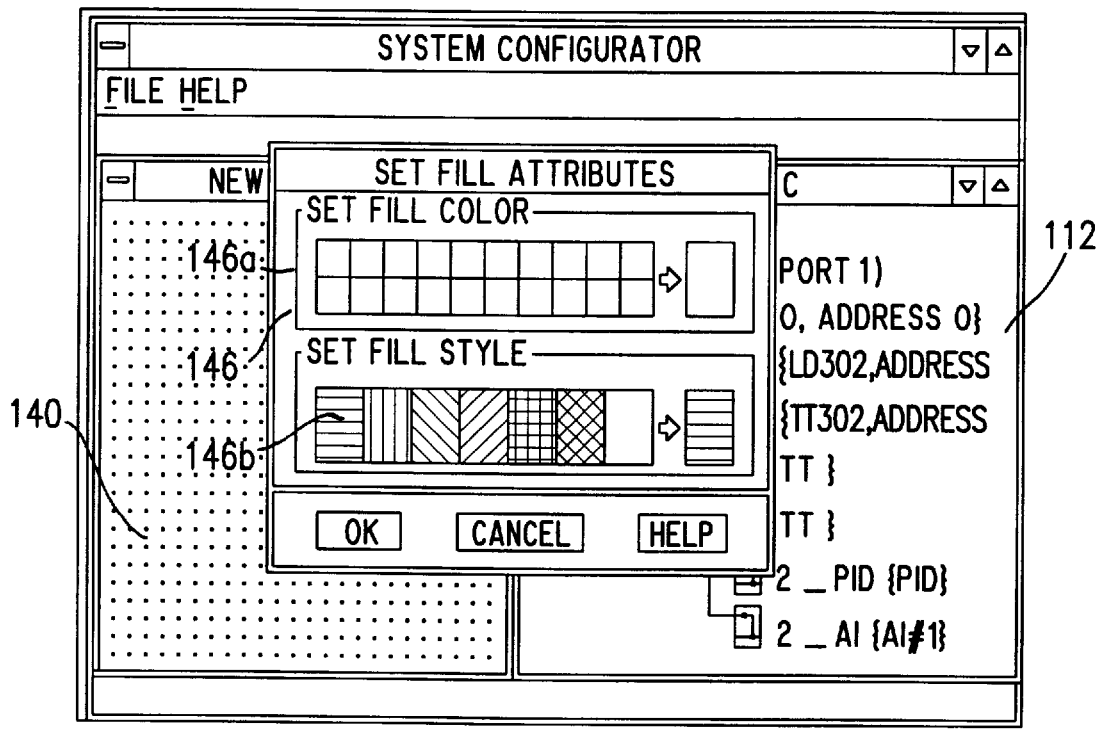

One of the functions the user can invoke from the toolbar 142 is a Fill Attributes function, represented by the field 143. This function allows a user to specify the fill attributes of the graphical representations of function blocks displayed in the function link window 140. When it is determined in step 4006 that the user has selected the Fill Attributes function, operation proceeds to step 4012 in which a Fill Attributes control window 146 is generated and displayed within the display area 110, as shown in FIG. 6L. The Fill Attributes control window 146 includes a Set Fill Color field 146a and a Set Fill Style field 146b. The user can select a fill color and/or a fill style by clicking on a selected color or style displayed in the respective field 146a and/or 146b. Once the user's inputs have been acquired at step 4014 (i.e., when the user clicks on the OK soft button), the Fill Attributes window 146 is closed and operation loops back to step 4004 to await a new user input. In this manner a color may be associated with one or more function blocks to be represented in the function window. For example, the user can make all PID function blocks in the link window red for easy identification.

Figure 6M:
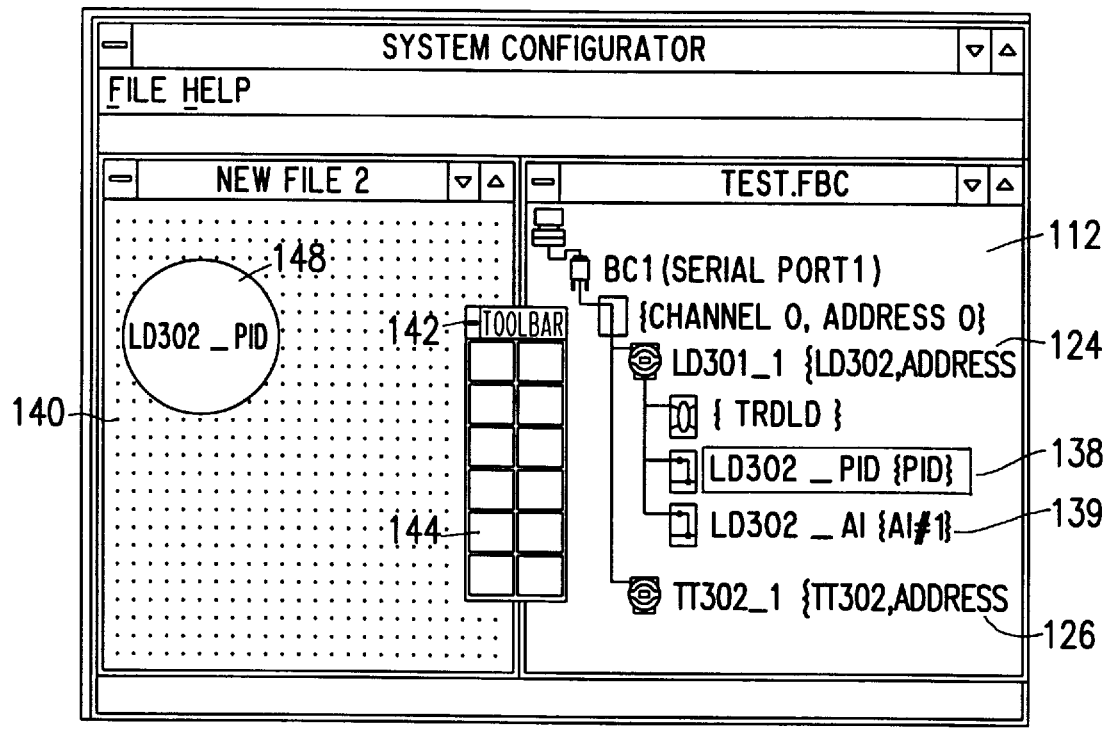

Another function the user can invoke from the toolbar 142 is the link tool, represented by the field 144. This function allows a user to select and link function blocks represented in the configuration window 112. When it is determined in step 4006 that the user has selected the link tool, operation proceeds to step 4008 in which a further input is awaited from the user. At this point, the user can select a function block to be linked by clicking on the function block's icon displayed in the configuration window 112. If it is determined in step 4016 that the user has done so, operation proceeds to step 4018 in which a graphical representation of the selected function block is generated and displayed in the function link window 140. This is depicted in FIG. 6M in which a function block represented by the icon 138 in the configuration window 112 was selected and represented in the function link window 140 by a function node 148. The color and fill pattern of the function node 148 were previously selected by the user using the Fill Attributes function on the toolbar 142.

Figure 6N:
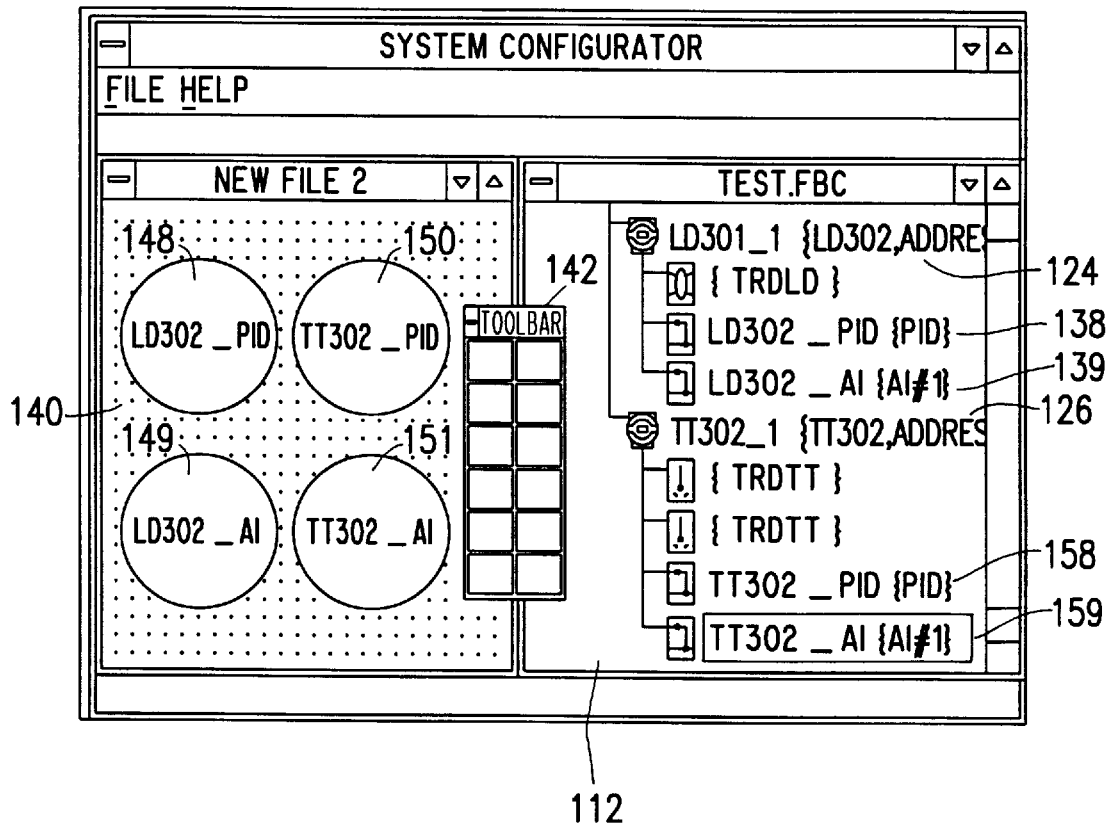
Figure 60:
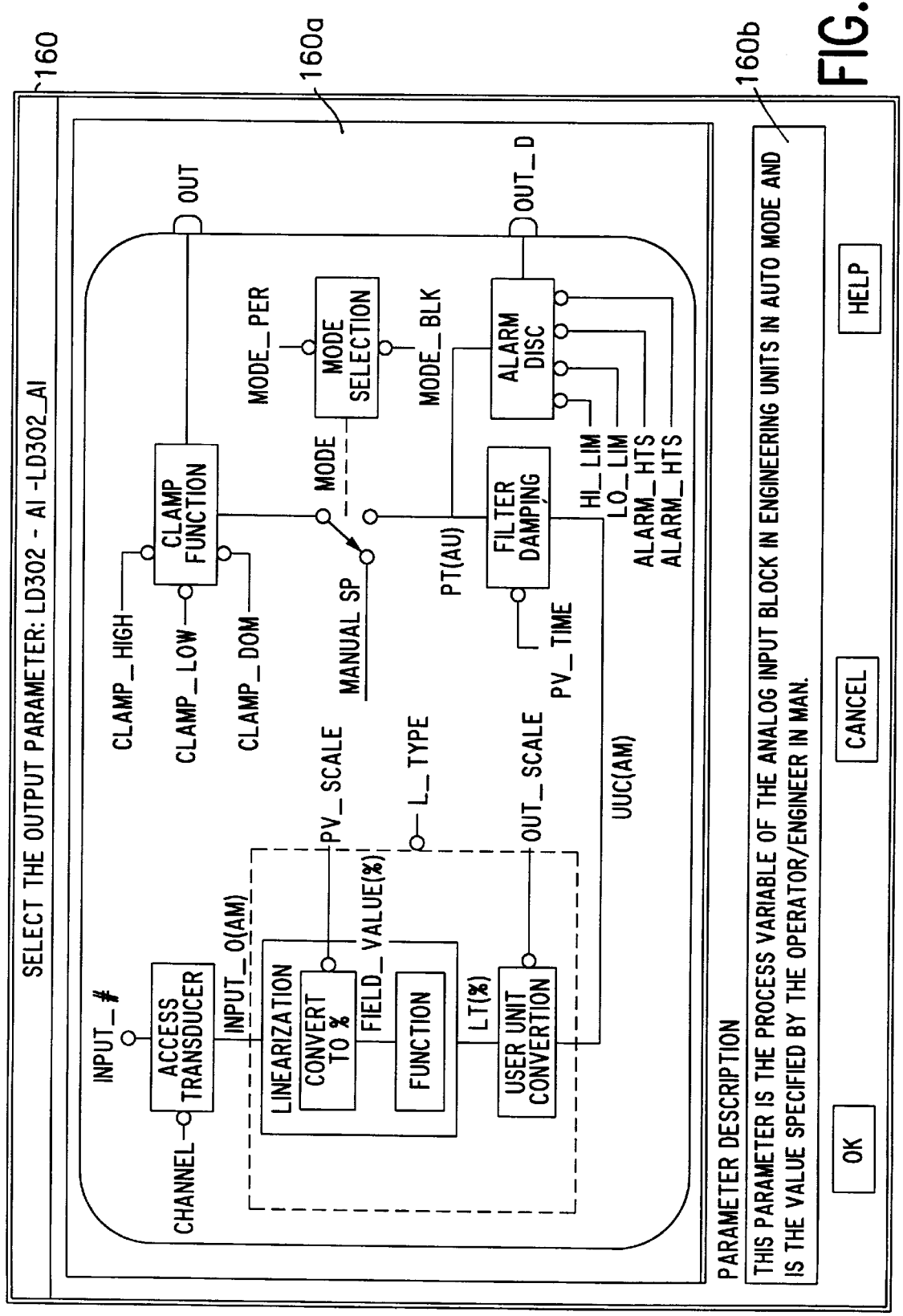

Operation now loops back to step 4008 to await and acquire a new user input. At this point, the user can select another function block from the configuration window 112 for linkage with the first selected function block. This procedure once again follows steps 4016 and 4018 and is repeated for each function block that is selected for linking. FIG. 6N depicts the contents of the function link window 140 after the user has selected four function blocks from the configuration window 112. The function link window 140 now displays four function nodes 148–151 corresponding to the four function blocks selected by the user. In the representative screen display of FIG. 6N, the user has selected the PID function block of the LD302 pressure sensor, represented in the link window by the node 148 and in the configuration window by the icon 138; the analog input block (AI) of the LD302 pressure sensor, represented in the link window by the node 149 and in the configuration window by the icon 139; the PID of the TT302 temperature sensor, represented in the link window by the node 150 and in the configuration window by the icon 158; and the AI block of the TT302 temperature sensor, represented in the link window by the node 151 and in the configuration window by the icon 159.

Once the user has selected all the function blocks that are to be linked, the process of specifying the links between the selected function blocks can begin. A further user input is now awaited and acquired at step 4008. The user can now select a function block for linkage by double-clicking on the function node representation of that block in the function link window 140. If it is determined at step 4016 that the user has done so, operation proceeds to step 4020 in which a block diagram window 160 is displayed, as depicted in FIG. 6O. The block diagram window 160 includes a display area 160a, for displaying a detailed block diagram of the selected function block. In the representative display depicted in FIG. 6O, the user has selected the AI block of the LD302 pressure sensor, which was represented in the function link window 140 by the function node 149 (FIG. 6N).

The block diagram window 160 also includes an information field 160b which provides descriptive information about a selected parameter, input or output.

The detailed block diagram displayed in the window 160 shows the various parameters, inputs and outputs and internal nodes of the selected function block. In the block diagram of the AI function block shown in FIG. 6O, two outputs OUT and OUT_D are shown. These outputs can be linked to inputs of other function blocks, i.e., in the actual Fieldbus system, signals output by the outputs OUT and OUT_D can be communicated over the Fieldbus to the inputs of function blocks of other field mounted devices, and/or communicated to other function blocks within the same field mounted device.

With the detailed block diagram of the selected function block displayed in the window 160, as shown in FIG. 6O, the user can now select an input or output to be linked by clicking on it. As shown in FIG. 6O, the user has selected the output OUT. When the user clicks on the OK key, his selection is acquired, at step 4022, and the screen display is returned to that shown in FIG. 6N.

Figure 6P:
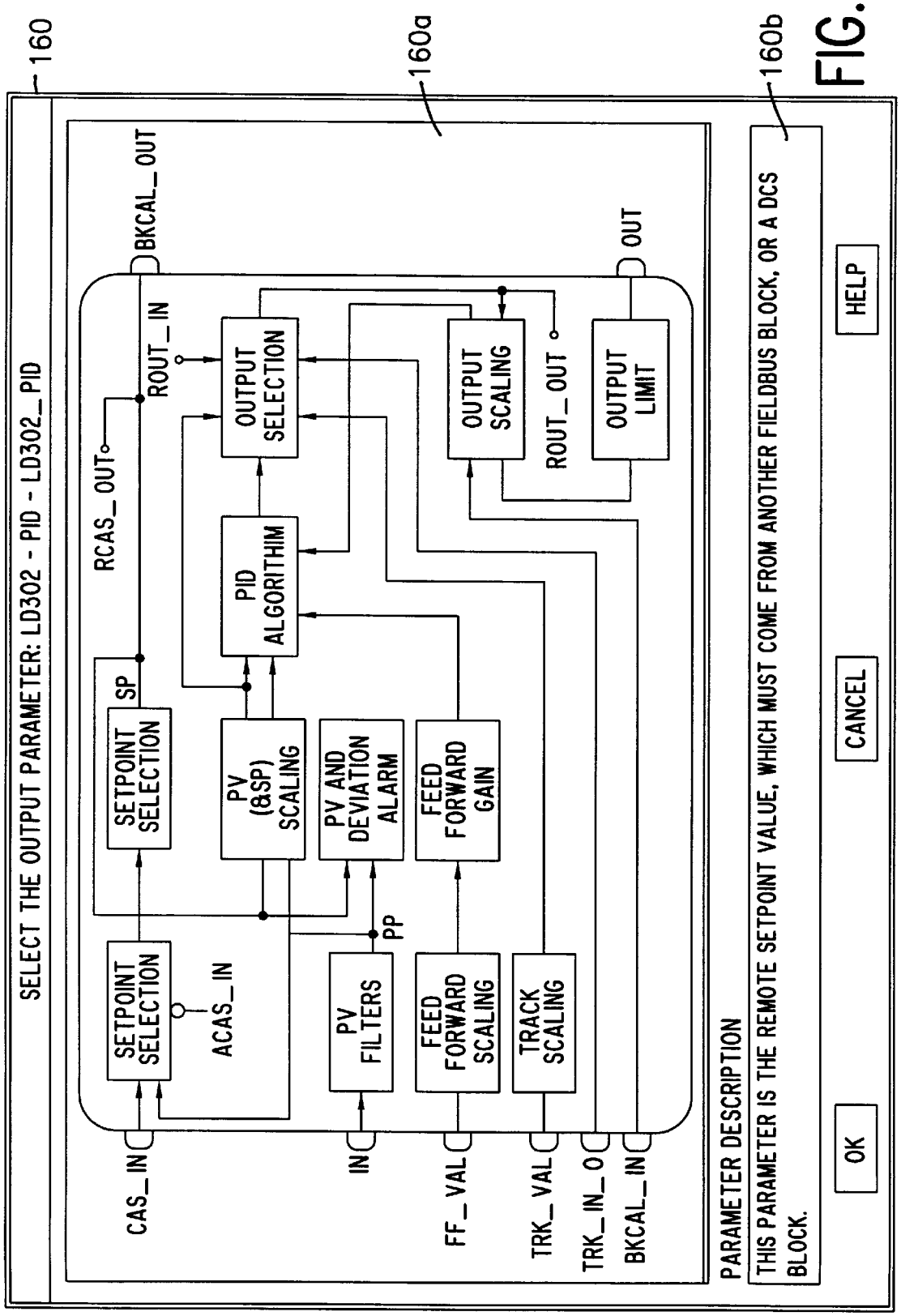
Figure 6Q:
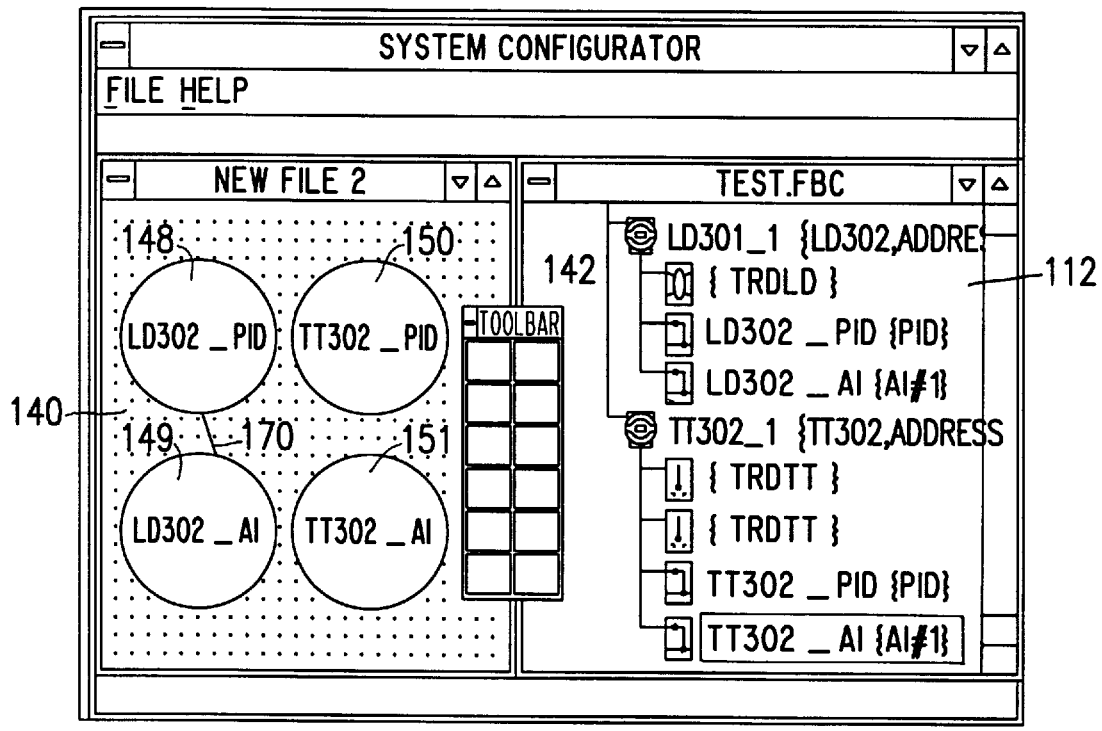

Once the user has selected an input or output of a function block to be linked, the user can then select a function block from the function link window 140 to be linked to the input or output selected, i.e., the OUT output of the AI function block of the LD302 pressure sensor. After the user has done so in step 4024, operation proceeds to step 4026 in which the detailed block diagram of the selected function block is displayed in the window 160 in the display area 110, as depicted in FIG. 6P. As shown in FIG. 6P, the user has selected the PID function block of the LD302 pressure sensor. With the detailed block diagram of the PID function block displayed in the window 160, the user can now select an input or an output to be linked to the input or output of the previously selected function block. In this example, the user has selected the CAS_IN input of the LD302 PID to be linked to the previously selected OUT output of the LD302 AI function block. Once the user has confirmed his selection by clicking on the OK field, at step 4028, operation proceeds to step 4030 in which the link file subroutine notes the selected linkage to be made for inclusion in the download file that is to be later downloaded to the Fieldbus system to be configured. In addition, the detailed block diagram window 160 is closed and the screen returns to the display of the function link and configuration windows 140 and 112, as shown in FIG. 6Q. Furthermore, in the function link window 140, a line 170 is displayed between the function block representations 148 and 149 to indicate that the two function blocks are linked.

Figure 6R:
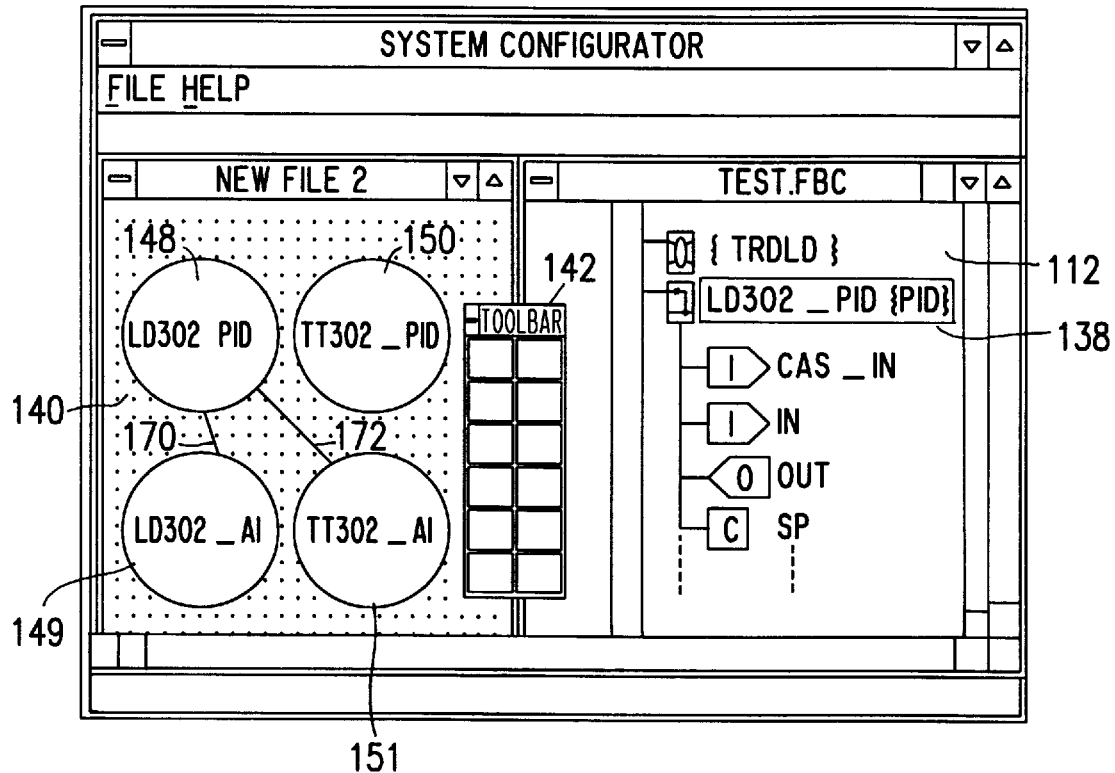
Figure 6S:
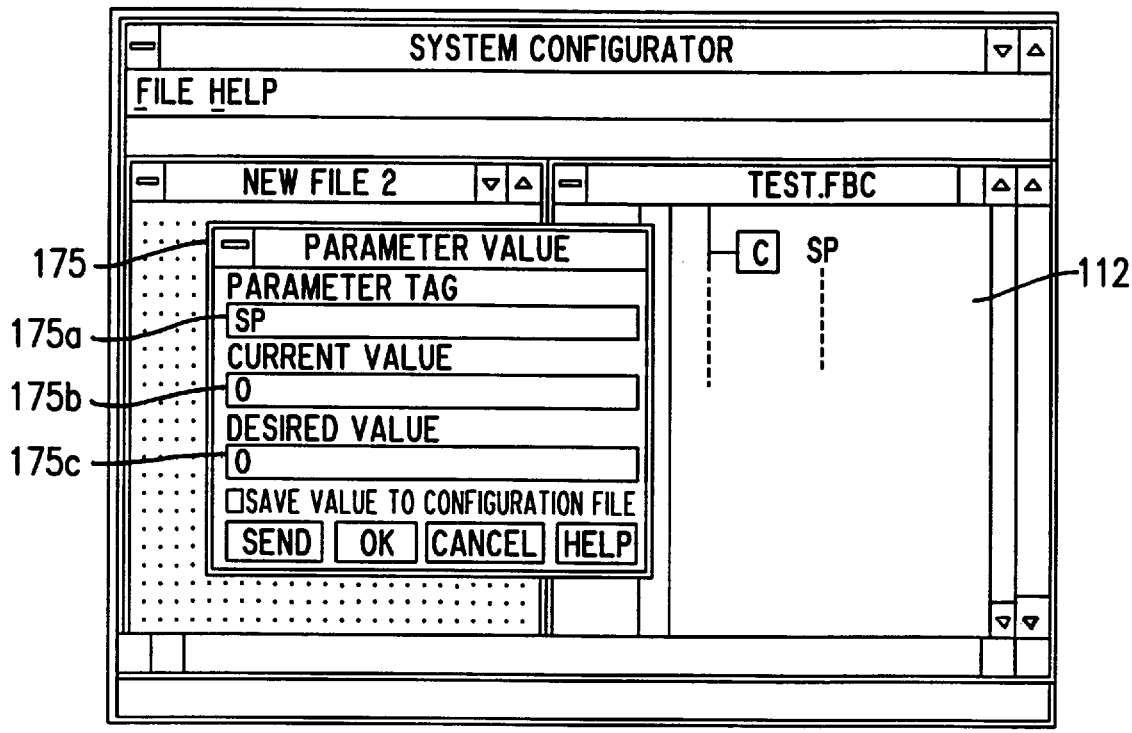

Operation then loops back to step 4008 to await a new user input. At this point, the user can specify further links between the function blocks by following the above-described procedure involving steps 4020 through 4030. FIG. 6R shows that the user has made an additional link, between the PID of the LD302 pressure sensor and the AI block of the TT302 temperature sensor. This link is represented by the line 172 linking the function block representations 148 and 151.

Once the procedure of linking the function blocks has been completed, the user can then specify the values of internal parameters of the function blocks. To do so, the user selects a function block, whose parameters are to be set, by double-clicking on the icon of the function block displayed in the configuration window 112. When it is determined in step 401G that the user has done so, operation proceeds to step 4032 in which a list of parameters, inputs and outputs of the selected function block is displayed in the configuration window 112, immediately beneath the selected function block. Such a list is displayed in FIG. 6R, which depicts the selection of the icon 138 representing the PID of the LD302 pressure sensor.

With the list of inputs, outputs and parameters displayed in the configuration window 112, the user can select a parameter to set by clicking on the parameter. When it is determined in step 4034 that the user has done so, operation proceeds to step 4036 in which a parameter value window 175 is displayed in the display area 110, as in the representative display shown in FIG. 6S. In the case shown, the user has selected the parameter SP, as indicated by the reverse-color display of the parameter SP in the configuration window 112 and by a parameter tag field 175a in the parameter window 175.

A field 175b in the parameter window 175 displays the current value of the selected parameter. The user can modify the parameter value by entering a desired value in a field 175c. Once the user has done, he can click on the OK button field to close the parameter window and select another parameter to be set. The parameter values are stored as part of the link file.

Once the process of setting values for the parameters of the function blocks in the system to be configured is complete, the user can save the configuration and link files and proceed with the downloading of the configuration and link files information to the Fieldbus system 30 from the master computer 20 through the interface device 10. As discussed above, the downloading procedure is initiated when the user selects the Download command from the File command menu.

During the downloading procedure, the configuration and function link information in the configuration and link files created during the system design phase is segmented and formatted into machine code for storage in the nonvolatile memories of the field mounted devices coupled to the Fieldbus 30.

In addition to downloading system configuration data to the field mounted devices, the system of the present invention also downloads communication arbitration information to the field mounted devices so that the control system can operate without the computer 20.

While the above description of the present invention has focused primarily in configuring devices and device functions to be used, part of the configuration and control method of the present invention relates to bus access management, and more particularly, control and scheduling of token passing. As discussed at page 10 of the SMAR, Fieldbus Tutorial, supra, in a Fieldbus system, a token may be used to represent a device's right to initiate a transaction of the Fieldbus.

Figure 7:
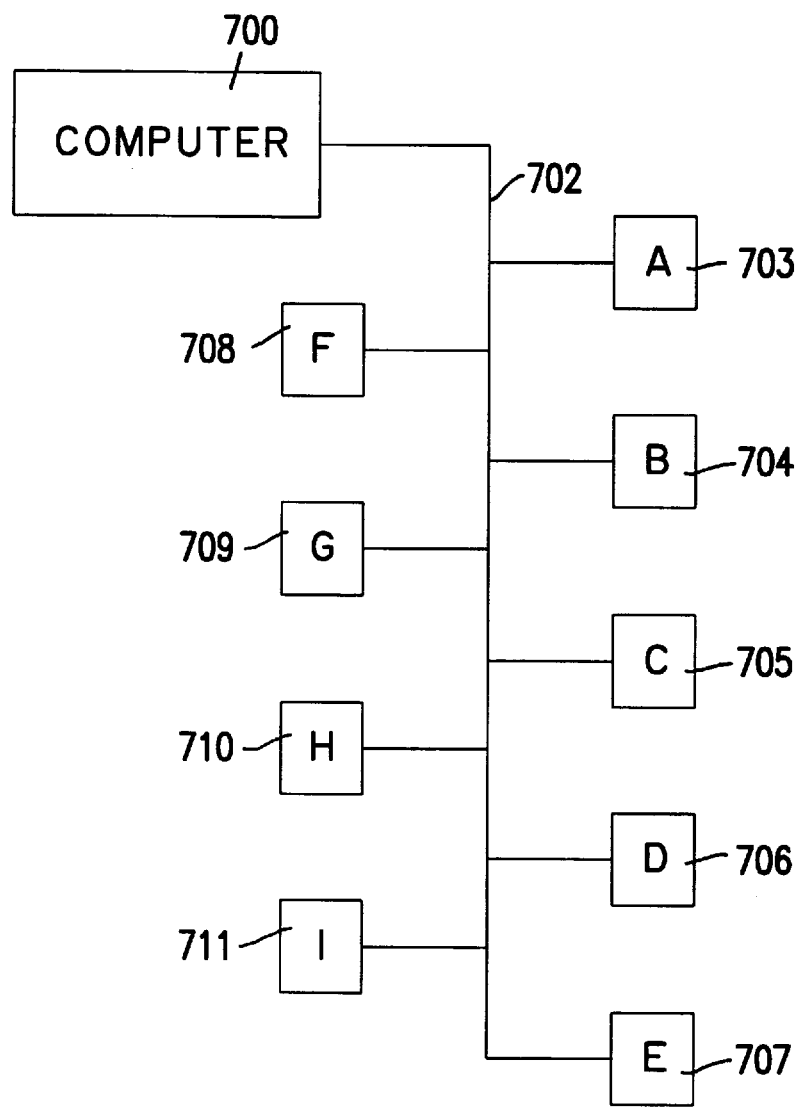
FIG. 7 illustrates a Fieldbus network including a control computer coupled by a Fieldbus to nine field mounted devices.

Referring now to FIG. 7, there is illustrated a Fieldbus network comprising a computer 700 which is coupled via a Fieldbus 702 to nine smart field mounted devices, devices A-I (703–711).

A CPU of either the computer 700 or one of the devices 703–711 acts as a link active scheduler ("LAS") which is responsible for controlling the passing of the token according to a preconfigured passing scheme or schedule.

In accordance with the present invention, by selecting a SCHEDULING command (not illustrated) from the file menu, a token passing schedule may be input by the user of the program and stored as part of either the configuration or link files. For example, in a Fieldbus network comprising the nine field mounted devices A, B, C, D, E, F, G, H, and I, (703–711) the schedule may indicate that the token is to be passed first to device A 703 and then to device B 704, then to device C 705 and so on with the token being passed finally to device I 711. Devices that do not request the right to initiate a bus transaction, may be skipped in the token passing sequence. A user may also designate the control computer 700 or a device 703–711 to act as the LAS. During normal operation, the computer 700 will normally be used as the LAS.

In accordance with one embodiment of the present invention, one or more field mounted devices 703–711 are programmed to act as either the primary LAS or as backup LASs in the event the primary LAS fails for some reason. In such an embodiment, a user can segment the token passing schedule and assign different portions of the schedule to different field mounted devices 703–711. Each field mounted device which is designated as a backup LAS monitors the bus for signals, or the absence of signals, for, e.g., a preselected period of time on the bus, indicative of a failure or fault in the primary LAS, e.g., the computer 700. Upon detecting a failure or fault in the primary LAS, the backup LASs take control over the Fieldbus 702 and insure the network continues operating even in the absence of the primary LAS. By segmenting the LAS schedule into segments which individual field mounted devices 703–711 can store and implement, an LAS schedule which is too large for a single field mounted device to store and/or implement may be implemented by the backup LAS devices. For example, if the above described token passing schedule were divided into three segments, A,B,C–D,E,F–G,H,I a different one of each of the three schedule segments can be downloaded into a different field mounted device. Thus device A 703 can be used as the backup LAS for the A,B,C schedule segment, device D 706 can be used as the backup LAS for the D,E,F schedule segment and device G 709 could be used as the backup LAS for segment H,I,J. In such an implementation, device A 703 is programmed to monitor for failure of the primary LAS and to take control upon detecting a failure in the primary LAS. After implementing its segment of the overall LAS schedule, device A 703 passes the token to device D 706 which, in the case of a failure of the primary LAS, then implements segment D,E,F of the overall schedule. After implementing its segment of the overall schedule, device D 706 passes the token to device G 709 which, in the case of a failure of the primary LAS, then implements segment G,H,I of the overall schedule. The token is then passed back to device A 703. In this manner, the network can continue to operate when the computer 700 fails or is removed from the Fieldbus network.

In one embodiment, the method of the present invention permits for distributed processing operations to be carried out amongst smart field mounted devices 703–711, e.g., field mounted pressure sensors, temperatures sensors, etc., which include CPU's.

As discussed above, smart field mounted devices include function blocks which are implemented in either software or hardware. Each function block represents, e.g., a data processing operation.

It is desirable to keep the cost of field mounted devices to a minimum. Accordingly, it is desirable to use CPUs with a minimum amount of processing power because such CPUs are generally less costly than more powerful CPUs.

In accordance with one embodiment of the present invention, the processing capabilities of multiple physically distinct and possibly physically distant field mounted control devices are used in combination to meet the processing requirements of a single field mounted control device.

This is accomplished by having a first field mounted device transmit to a second field mounted device, over, e.g., a Fieldbus, data, sensed information, and/or processing parameters. The second field mounted device then performs the desired processing using one of its internal function blocks and returns the result to the first device which can then use the result to perform additional processing using, e.g., function blocks internal to the first device.

In this manner, function blocks and the processing capability of a second field mounted device can be used by a first field mounted device.

The control and configuration program of the present invention, in one embodiment, supports such distributed processing capabilities. In such an embodiment, function blocks of the second device displayed in the configuration window can be copied to the first device by selecting the icon representing the function block of the second device and dragging it to the first device. The icon representing the function block of the second device is thus copied to the first device as represented by the function block being attached to the first device.

The function block of the second device that is copied and attached to the first device represents a virtual function block of the first device, i.e., a function block which is not actually internal to the first device but which, for design purposes, may be treated as if it were. Inputs and outputs of a virtual function block of a device may be coupled, e.g., linked, to other function block inputs in the manner described above using the link tool and the link window. Inputs and outputs of a virtual function block are network signals, e.g., signals which are transmitted over the network, e.g., from and to, the first device.

The program of the present invention, keeps track of where, e.g., in which field mounted device, the real function block corresponding to a virtual function block is located within the network of devices. The location relationship between real and virtual function blocks is stored as part of the configuration file.

Information regarding the parameter values and inputs and outputs of a virtual function block, supplied by a user in the same manner as a real function block, are also stored as part of the configuration file. In this manner, a first set of parameter values for the function block of the second device may be stored for use when the second device uses the function block and a second set of parameter values may be stored for use when the first device uses the function block of the second device as a virtual function block.

In addition to generating and storing parameter information relating to a virtual function block, the program of the present invention generates instructions which instruct the first device to transmit the relevant data to the second device for processing whenever the first device calls the virtual function block and for the second device to return the results of the processing operation to the first device.

The portions of the information stored in the configuration and link files relevant to the operation of the first and second function blocks may be downloaded to the first and second function blocks and stored in the memory of the first and second devices.

While the present application refers to separate configuration and link files it will be apparent to one of ordinary skill in the art in view of the teachings of this application that configuration and control information may be stored in one or more files as may be desired.

What is claimed is:

1. A system for configuring a process control system having intelligent field mounted devices coupled to a data communications bus, the system for configuring comprising:

a computer including a display device, a storage device and a data communications device; and an interface device for coupling to the data communications device of the computer for communicating data between the computer and the data communications bus of the process control system, wherein the storage device of the computer stores a program for controlling the computer to:

receive configuration information specifying the field mounted devices and function blocks of the field mounted devices to be included in the process control system;

for each of the specified field mounted devices, retrieve, from the storage device, at least one of first data and second data, the first data indicating at least one input of the field mounted device, the second data indicating at least one output of the field mounted device;

generate a graphical representation of the process control system on the display device using the configuration information; and download the configuration information to the field mounted devices via the interface device.

2. The system of claim 1, wherein the configuration information further includes tag and address information for each of the field mounted devices and function blocks to be included in the process control system.

3. The system of claim 1, wherein the configuration information further includes parameter information which indicates the values of parameters of each of the function blocks to be included in the process control system.

4. The system of claim 1, wherein the data communications bus is a Fieldbus.

5. The system of claim 1, wherein the program for controlling the computer provides a window-based user interface.

6. The system of claim 1, wherein the computer acts as a master on the data communications bus and the field mounted devices act as slaves.

7. The system of claim 1, wherein the computer is decoupled from the data communications bus after the computer downloads the configuration data to the field mounted devices and one of the field mounted devices acts as a master on the data communications bus.

8. A method for configuring a process control system having intelligent field mounted devices coupled to a data communications bus, the method comprising the steps of:

receiving configuration information specifying the field mounted devices and function blocks of the field mounted devices to be included in the process control system;

for each of the specified field mounted devices, retrieving, from a storage device of a computer, at least one of first data and second data, the first data indicating at least one input of the field mounted device, the second data indicating at least one output of the field mounted device;

generating a graphical representation of the process control system using the configuration information; and downloading the configuration information to the field mounted devices.

9. The method of claim 8, wherein the configuration information further includes tag and address information for each of the field mounted devices and function blocks to be included in the process control system.

10. The method of claim 8, wherein the configuration information further includes parameter information which indicates the values of parameters of each of the function blocks to be included in the process control system.

11. The method of claim 8, wherein the data communications bus is a Fieldbus.

12. The method of claim 8, wherein the configuration data is received and the graphical representation of the process control system is displayed with a window-based user interface.

13. The method of claim 8, further comprising the step of:

controlling the process control system after the step of downloading the configuration information to the field mounted devices.

14. The system of claim 1, wherein the program further controls the computer to:

associate at least a part of the second data of a first one of the field mounted devices with at least a part of the first data of a second one of the field mounted devices based on at least one user-defined instruction.

15. The method of claim 8, further comprising the step of:

associating at least a part of the second data of a first one of the field mounted devices with at least a part of the first data of a second one of the field mounted devices based on at least one user-defined instruction.

* * * * *